US008346843B2

(12) United States Patent
Jain

(10) Patent No.: US 8,346,843 B2
(45) Date of Patent: Jan. 1, 2013

(54) SYSTEM AND METHOD FOR SCALABLE DATA DISTRIBUTION

(75) Inventor: Arvind Jain, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 2118 days.

(21) Appl. No.: 11/009,569

(22) Filed: Dec. 10, 2004

(65) Prior Publication Data

US 2006/0126201 A1 Jun. 15, 2006

(51) Int. Cl.
*G06F 15/16* (2006.01)

(52) U.S. Cl. ........... 709/201; 709/203; 709/204; 360/15

(58) Field of Classification Search .................. 709/203, 709/204, 201; 360/15
See application file for complete search history.

(56) References Cited

U.S. PATENT DOCUMENTS

| | | | |
|---|---|---|---|
| D295,632 S | 5/1988 | Wells-Papanek et al. ..... D18/27 |
| D295,764 S | 5/1988 | Wells-Papanek et al. ..... D18/27 |
| 5,721,914 A | 2/1998 | DeVries ........................ 395/615 |
| D396,455 S | 7/1998 | Bier ........................... D14/114.3 |
| 5,884,031 A | 3/1999 | Ice ............................. 395/200.33 |
| 5,913,026 A | 6/1999 | Bleidt et al. ............. 395/200.13 |
| 5,920,701 A | 7/1999 | Miller et al. ............. 395/200.58 |
| 6,070,191 A | 5/2000 | Narendran et al. ........... 709/226 |
| 6,098,078 A | 8/2000 | Gehani et al. |
| 6,134,596 A | 10/2000 | Bolosky et al. ............... 709/233 |
| 6,141,762 A | 10/2000 | Nicol et al. |
| 6,189,039 B1 | 2/2001 | Harvey et al. |
| 6,223,226 B1 | 4/2001 | Miyahara ..................... 709/241 |
| 6,370,580 B2 | 4/2002 | Kriegsman ................... 709/226 |
| 6,374,336 B1 | 4/2002 | Peters et al. .................. 711/167 |
| 6,427,172 B1 | 7/2002 | Thacker et al. .............. 709/235 |
| 6,438,553 B1 * | 8/2002 | Yamada ........................... 707/10 |
| 6,467,046 B1 | 10/2002 | Cunliffe et al. |
| 6,477,548 B1 | 11/2002 | Nihei |
| 6,477,566 B1 | 11/2002 | Davis et al. .................. 709/223 |
| 6,484,204 B1 | 11/2002 | Rabinovich |
| D469,444 S | 1/2003 | Ording et al. ............... D14/487 |

(Continued)

FOREIGN PATENT DOCUMENTS

WO WO 03/012578 2/2003

(Continued)

OTHER PUBLICATIONS

Google Inc., Office Action, Australian Patent Application 2005314690, Aug. 4, 2009, 2 pgs.

(Continued)

*Primary Examiner* — Adnan Mirza
(74) *Attorney, Agent, or Firm* — Morgan, Lewis & Bockius LLP

(57) ABSTRACT

A system having a resource manager, a plurality of masters, and a plurality of slaves, interconnected by a communications network. To distribute data, a master determined that a destination slave of the plurality slaves requires data. The master then generates a list of slaves from which to transfer the data to the destination slave. The master transmits the list to the resource manager. The resource manager is configured to select a source slave from the list based on available system resources. Once a source is selected by the resource manager, the master receives an instruction from the resource manager to initiate a transfer of the data from the source slave to the destination slave. The master then transmits an instruction to commence the transfer.

39 Claims, 16 Drawing Sheets

U.S. PATENT DOCUMENTS

| | | | |
|---|---|---|---|
| D472,244 S | 3/2003 | Wasko | D14/486 |
| D473,565 S | 4/2003 | Groves | D14/486 |
| D474,201 S | 5/2003 | Chaudhri et al. | D14/492 |
| 6,606,643 B1 | 8/2003 | Emens et al. | |
| 6,618,752 B1 | 9/2003 | Moore et al. | |
| 6,671,705 B1 | 12/2003 | Duprey et al. | |
| 6,718,361 B1 | 4/2004 | Basani et al. | |
| 6,732,144 B1 * | 5/2004 | Kizu et al. | 709/203 |
| 6,748,447 B1 | 6/2004 | Basani et al. | 709/244 |
| 6,859,839 B1 | 2/2005 | Zahorjan et al. | |
| 6,901,604 B1 | 5/2005 | Kiraly | |
| 6,940,666 B2 * | 9/2005 | Hanagata et al. | 360/15 |
| 6,970,937 B1 | 11/2005 | Huntington | |
| 6,990,667 B2 | 1/2006 | Ulrich et al. | |
| 6,996,668 B2 | 2/2006 | Gaertner et al. | |
| 7,035,933 B2 | 4/2006 | O'neal et al. | |
| 7,039,173 B2 | 5/2006 | Tuunanen | |
| 7,065,618 B1 | 6/2006 | Ghemawat et al. | |
| 7,089,301 B1 * | 8/2006 | Labio et al. | 709/224 |
| 7,325,073 B2 | 1/2008 | Shao et al. | |
| 2002/0059416 A1 | 5/2002 | Tuunanen | |
| 2002/0059592 A1 | 5/2002 | Kiraly | |
| 2002/0103968 A1 | 8/2002 | Grover | |
| 2002/0138559 A1 | 9/2002 | Ulrich et al. | |
| 2002/0194324 A1 | 12/2002 | Guha | |
| 2003/0014523 A1 | 1/2003 | Teloh et al. | |
| 2003/0028726 A1 | 2/2003 | Gaertner et al. | |
| 2003/0046283 A1 | 3/2003 | Roberts | 707/6 |
| 2003/0101278 A1 | 5/2003 | Garcia-Luna-Aceves et al. | |
| 2003/0131193 A1 | 7/2003 | Kodama et al. | |
| 2003/0200307 A1 | 10/2003 | Raju et al. | |
| 2003/0204571 A1 | 10/2003 | Waltermann | |
| 2003/0212869 A1 | 11/2003 | Burkey | |
| 2003/0225884 A1 | 12/2003 | Hayden | |
| 2004/0019721 A1 | 1/2004 | Drerup et al. | |
| 2004/0093361 A1 | 5/2004 | Therrien et al. | |
| 2004/0143672 A1 | 7/2004 | Padmanabham et al. | |
| 2004/0223615 A1 | 11/2004 | Dhawan | |
| 2004/0260873 A1 | 12/2004 | Watanabe | |
| 2005/0015436 A1 | 1/2005 | Singh et al. | |
| 2005/0273514 A1 | 12/2005 | Milkey et al. | |
| 2006/0129775 A1 | 6/2006 | Hulsey | |
| 2006/0271705 A1 | 11/2006 | Carcia-Luna-Aceves | |
| 2007/0174471 A1 | 7/2007 | Van Rossum | |
| 2008/0005780 A1 | 1/2008 | Singleton | |
| 2008/0016028 A1 | 1/2008 | Wilding et al. | |

FOREIGN PATENT DOCUMENTS

| | | |
|---|---|---|
| WO | WO 03/039053 | 5/2003 |

OTHER PUBLICATIONS

Google Inc., Office Action, Canadian Patent Application 2,590,955, Jul. 9, 2009, 5 pgs.

Google Inc., Office Action, European Patent Application 05849756. 1, Sep. 20, 2007, 7 pgs.

Google Inc., International Search Report and Written Opinion, PCT/US2005/044747, May 9, 2006, 10 pgs.

Chawathe, Y., "Scattercast: An Architecture for Internet Broadcast Distribution as an Infrastructure Service," Ph.D. Dissertation, University of California at Berkeley, Fall 2000, http://berkeley.chawathe.com/thesis/thesis-single.pdf.

Chawathe, Y. et al., "An Architecture for Internet Content Distribution as an Infrastructure Service," Feb. 2000. Unpublished work. http://citeseer.ist.psu.edu/chawathe00architecture.html.

Postel, J., et al., RFC 959: File Transfer Protocol (FTP), Oct. 1985.

Cohen, B., "Incentives Build Robustness in BitTorrent," May 22, 2003, http://bitconjurer.org/BitTorrent/bittorrentecon.pdf.

Osokine, S., "Search Optimization in the Distributed Networks," Oct. 15, 2002, www.grouter.net/gnutella/search.htm.

Padmanabhan, V., et al. "Distributing Streaming Media Content Using Cooperative Networking," NOSSDAV '02, May 12, 2002, and Microsoft Research Technical Report, MSR-TR-2002-37, Apr. 2002.

Bawa, M. et al., "Transience of Peers and Streaming Media," Hornets, Oct. 2002.

Nguyen, T., et al., "Distributed Video Streaming Over Internet," Multimedia Computing and Networking, Jan. 2002.

Rowstron, A., et al., "Storage management and caching in PAST, a large-scale, persistent peer-to-peer storage utility," ACM SOSP, Oct. 2001.

Stoica, I. et al., "Chord: A Scalable Peer-to-peer Lookup Service for Internet Applications," ACM SIGCOMM, Aug. 2001.

Zhao, B., et al., Tapestry: An Infrastructure for Fault-tolerant Wide-area Location and Routing, Technical Report UCB/CSD-01-1141, Computer Science Division, University of California at Berkeley, Apr. 2001.

Bergner, M., "Improving Performance of Modern Peer-to-Peer Services," Masters Thesis, Dept. of Computing Science, Umea University, Jun. 10, 2003, pp. 1-132.

Hyde, D.C., "How New Peer to Peer Developments May Effect Collaborative Systems," 3$^{rd}$ Int'l Symposium on Collaborative Technologies and Systems, San Antonio, Texas, Jan. 28, 2002, pp. 1-6.

Adam, Regeneration with Virtual Copies for Distributed Computing Systems, vol. 19, No. 6, IEEE Transactions on Software Engineering, Jun. 1993, 9 pgs.

CERF, RFC 675, Specification of Internet Transmission Control Program, Dec. 1974, 141 pgs.

Wolfson, An Adaptive Data Replication Algorithm, University of Illinois, Chicago, IL., ACM Transactions on Database Systems, vol. 22, No. 2, Jun. 1997, 60 pgs.

Wolfson, Distributed Algorithms for Dynamic Replication of Data, Jun. 1992, 15 pgs.

* cited by examiner

FileSet 324
| FileID | Version |
|---|---|
| File001 | 022 |
| File002 | 025 |
| File002abc | 002 |
| ⋮ | ⋮ |
FIG. 3B
Slave State 326
| FileID | Version | File Size |
|---|---|---|
| FileSet07 | 096 | 10KB |
| File001 | 022 | 0 |
| File002 | 025 | 16MB |
| File002abc | 002 | 64MB |
| ⋮ | ⋮ | ⋮ |
FIG. 3C
Data File 328
Checksum File 330
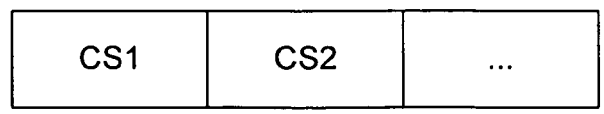
FIG. 3D Global Hierarchy Table 480

Slave Level Graph 486

| Slave ID | Slave Location |
|---|---|
| Slave1 | R1 |
| Slave2 | R1 |
| . . . | R1 |
| Slave17 | R2 |
| Slave18 | R2 |
| . . . | R2 |
| Slave134 | R35 |
| Slave135 | R35 |
| . . . | . . . |
| Slave452 | R139 |

Rack Level Graph 488

| Rack ID | Rack Location |
|---|---|
| R1 | DC1 |
| R2 | DC1 |
| . . . | DC1 |
| R35 | DC2 |
| . . . | . . . |
| R120 | DC4 |
| . . . | . . . |
| R139 | DC4 |

FIG. 4B

Idleness Table 482

| Slave ID | Outbound Transmissions |
|---|---|
| Slave1 | 0 |
| Slave2 | 3 |
| . . . | . . . |
| Slave34 | 1 |
| Slave35 | 0 |

FIG. 4C

Fileset State Table 484

| Resource ID | State | Failure Count | Attempts |
|---|---|---|---|
| T1 | 1 | 10 | 255 |
| ... | ... | ... | ... |
| TJ | 1 | 0 | 505 |
| DC1 | 1 | 1 | 543 |
| ... | ... | ... | ... |
| DCK | 1 | 0 | 123 |
| R123 | 1 | 5 | 5678 |
| R124 | 1 | 0 | 1003 |
| ... | ... | ... | ... |
| RN | 1 | 8 | 102 |

| | | | | Last Contact | Last Copied From | State Pointer |
|---|---|---|---|---|---|---|
| Slave1 | 1 | 2 | 122 | 01:02:03 | Slave4-R1-DC1 | |
| Slave2 | 0 | 50 | 98 | 00:01:00 | Slave3-R2-DC1 | |
| Slave3 | 1 | 1 | 57 | 01:02:08 | Slave5-R2-DC2 | |
| ... | ... | ... | ... | | | |
| SlaveM | 1 | 1 | 89 | 01:02:01 | | |

Slave3-R2-DC1 State:

| FileID | Version | File Size | Failure Cnt | Attempts | State | Want Newest |
|---|---|---|---|---|---|---|
| FileSet07 | 096 | 10KB | 0 | 7 | 1 | 1 |
| File001 | 032 | 0 | 0 | 0 | 0 | 0 |
| File002 | 035 | 16MB | 1 | 4 | 1 | 0 |
| File003abc | 002 | 64MB | 2 | 9 | 1 | 0 |
| ... | ... | ... | ... | ... | ... | ... |

Pointer to list of slaves with same files ~ 431

List of slaves having the files in FileSet07 ~ 433

FIG. 4D

Global Hierarchy Table 580

Slave Level Graph 586

| Slave ID | Slave Location |
|---|---|
| Slave1 | R1 |
| Slave2 | R1 |
| . . . | R1 |
| Slave17 | R2 |
| Slave18 | R2 |
| . . . | R2 |
| Slave134 | R35 |
| Slave135 | R35 |
| . . . | . . . |
| Slave452 | R139 |

Rack Level Graph 588

| Rack ID | Rack Location |
|---|---|
| R1 | DC1 |
| R2 | DC1 |
| . . . | DC1 |
| R35 | DC2 |
| . . . | . . . |
| R120 | DC4 |
| . . . | . . . |
| R139 | DC4 |

FIG. 5B

Global Resources Table 582

| Slave ID | Inbound BW | In BW in use | Outbound BW | Out BW in use |
|---|---|---|---|---|
| Slave1 | 100 | 0 | 100 | 20 |
| Slave2 | 100 | 100 | 100 | 100 |
| ... | ... | ... | ... | ... |
| Slave34 | 100 | 80 | 100 | 10 |
| Slave35 | 70 | 10 | 70 | 10 |
| ... | ... | ... | ... | ... |
| Slave159 | 100 | 0 | 100 | 80 |
| Slave160 | 100 | 10 | 100 | 0 |
| ... | ... | ... | ... | ... |
| Salve756 | 100 | 0 | 100 | 0 |

Slave Level Resources Graph 521

| Rack ID | Inbound BW | In BW in use | Outbound BW | Out BW in use |
|---|---|---|---|---|
| R1 | 300 | 0 | 300 | 120 |
| R2 | 300 | 40 | 300 | 80 |
| ... | ... | ... | ... | ... |
| R17 | 300 | 80 | 300 | 0 |
| ... | ... | ... | ... | ... |
| R34 | 250 | 100 | 250 | 60 |
| ... | ... | ... | ... | ... |
| R123 | 300 | 10 | 300 | 0 |

Rack Level Resources Graph 525

| Datacenter ID | Inbound BW | In BW in use | Outbound BW | Out BW in use |
|---|---|---|---|---|
| DC 1 | 500 | 0 | 500 | 120 |
| DC 2 | 500 | 40 | 500 | 80 |
| ... | ... | ... | ... | ... |
| DC 4 | 400 | 80 | 400 | 0 |

Datacenter Level Resources Graph 527

| Trunk ID | BW | BW in use | Start | End | Latency |
|---|---|---|---|---|---|
| T1 | 25 | 0 | DC1 | DC2 | 100 ms |
| T2N | 50 | 40 | DC1 | DC3 | 100 ms |
| T2S | 100 | 100 | DC3 | DC1 | 50 ms |
| T3W | 30 | 0 | DC3 | DC4 | 45 ms |
| T3E | 30 | 20 | DC2 | DC4 | 15 ms |
| T4 | 30 | 20 | DC2 | DC3 | 35 ms |

Trunk Level Resources Graph 528

FIG. 5C

Active Priority Levels Table
584

| Link | Current | Past |
|------|---------|------|
| L1   |         |      |
| L2   |         |      |
| L3   |         |      |
|      |         |      |

| Priority | Total Resources | Resources Remaining |
|----------|-----------------|---------------------|
| P1       | 0 MB            | 0 MB                |
| P2       | 400 MB          | 300 MB              |
| P3       | 600 MB          | 0 MB                |
| ...      |                 |                     |

| Priority | Flag |
|----------|------|
| P1       | 0    |
| P2       | 1    |
| P3       | 1    |
| ...      |      |

FIG. 5D

Priority Table
590

| Fileset   | Priority |
|-----------|----------|
| Fileset_1 | P1       |
| Fileset_2 | P2       |
| ...       | ...      |
| Fileset_x | P2       |
| Fileset_y | P5       |

FIG. 5E

SYSTEM AND METHOD FOR SCALABLE DATA DISTRIBUTION

FIELD OF THE INVENTION

The invention relates generally to data distribution. More particularly, the invention is directed to a system and method for distributing large amounts of data over a widely dispersed network.

BACKGROUND OF THE INVENTION

Data distribution, otherwise known as data deployment, data logistics, or data replication, includes the placement and maintenance of replicated data at multiple data sites across a network. Historically, data distribution has been either point-to-point, i.e., communication from one location to another, or multipoint, i.e., communication from one location to many. However, such data distribution has many drawbacks. For example, if multiple clients simultaneously request the same file from the same server, the server may become overloaded and no longer be able to respond efficiently to normal requests. This is commonly known as denial of service.

Clients and servers may be widely distributed from one another. Therefore, communication between the clients and server may consume valuable system resources, where system resources are the components that provide the network's inherent capabilities and contribute to its overall performance. System resources include routers, switches, dedicated digital circuits, bandwidth, memory, hard disk space, etc.

Still further, distributing data between widely dispersed data sites is often unreliable, as the further the distance between data sites the higher the probability of delays, packet loss, and system malfunction. Such data distribution between widely dispersed data sites is also typically slow due to the large distances the data, and any acknowledgements of the receipt of such data, must travel.

The above-mentioned drawbacks are compounded when large volumes of data, such as terabytes, are to be transferred between dispersed data sites.

Additionally, as the number of machines and data sites increase within a network, scalability becomes an issue. For example, many current data distribution systems require some form of centralized control. As such networks grow, the centralized control must handle more and more requests. The centralized control unit can become overwhelmed with requests and may become a bottleneck for the entire network. Additionally, the network may become vulnerable to inoperability due to failure of the centralized control unit. As a result, centralized control becomes an increasing liability as the network grows.

Some mechanisms have been developed in an attempt to address the scalability issue, including various public domain peer-to-peer distribution systems However, these systems are not optimal, as they do not account for global resource constraints when scheduling data transfer operations. Ignorance of global resource constraints can lead to decreased aggregate throughput, due to collisions and packet drops within the network. Additionally, ignorance of global resource constraints also makes prioritization of file transfers more difficult.

Accordingly, a system and method for reliably distributing large amounts of data between widely dispersed data sites would be highly desirable. Furthermore, it would also be highly desirable if such a system is easily scalable.

SUMMARY OF THE INVENTION

According to one embodiment, there is provided a method of distributing files over a network. The method operates in a system having a plurality of masters, a plurality of slaves, and a resource manager, interconnected by a communications network. Each slave sends slave state information to a master. The slave state information contains information on what files each slave has and needs.

According to one aspect of the invention, a master determines from the slave state information it receives that a slave requires a file. The master determines the possible sources for that file, based on the slave state information received from slaves. The master ranks these potential sources based on a set of criteria, such as network distance and idleness. The master sends a ranked list of possible sources to a resource manager.

According to another aspect of the invention, the resource manager chooses the best source for a copy operation, according to the rankings provided by the master. The resource manager stores resource capability information indicating data transmission resource capabilities for the resources required to transmit data between the slaves, and stores resource usage information indicating amounts of data transmission bandwidth allocated to copy operations. The resource manager also allocates resources for copy operations on each link based on the priorities of past copy operations on that same link. Copy operations are scheduled in accordance with the resource allocations made by the resource manager.

By having multiple masters and the resource manager, the burden on any one master is reduced, allowing the network to scale. Copy operations utilize the best available source, given resource constraints on the network. This makes copy operations efficient. Furthermore, prioritization and allocation of resources based on such prioritization allows fast updating of time-sensitive files.

BRIEF DESCRIPTION OF THE DRAWINGS

For a better understanding of the nature and objects of the invention, reference should be made to the following detailed description, taken in conjunction with the accompanying drawings, in which:

FIG. 3B is a block diagram of the fileset file shown in FIG. 3A;

FIG. 3C is a block diagram of the slave state shown in FIG. 3A;

FIG. 3D is a schematic of a data file and a checksum file, according to an embodiment of the invention;

FIG. 4B is a block diagram of the global hierarchy table shown in FIG. 4A;

FIG. 4C is a block diagram of the idleness table shown in FIG. 4A;

FIG. 4D is a block diagram of the fileset state table shown in FIG. 4A;

FIG. 5B is a block diagram of the global hierarchy table shown in FIG. 5A;

FIG. 5C is a block diagram of the global resources table shown in FIG. 5A;

FIG. 5D is a block diagram of the active priority levels table shown in FIG. 5A;

FIG. 5E is a block diagram of the priority table shown in FIG. 5A;

DETAILED DESCRIPTION OF EMBODIMENTS

A resource manager instructs multiple masters to schedule data copy operations between slaves. The data copy operations are optimized, such that for each copy operation the best available slave acts as a source slave for copying data to a destination slave. In general, the master is responsible for determining the possible source slaves that a destination slave can copy a file from and ranking those source slaves based on predefined criteria. When ranking possible source slaves, a master takes into account characteristics such as the size of the file at a source slave, the idleness of a source slave, and the network distance between the destination slave and the source slave. In some embodiments, file copy or transfer operations are scheduled over links that have sufficient resources to accommodate the file copy operation. This methodology ensures that each file copy operation uses the best source slave possible, while dynamically scheduling copy operations in accordance with available system resources.

Figure 1:
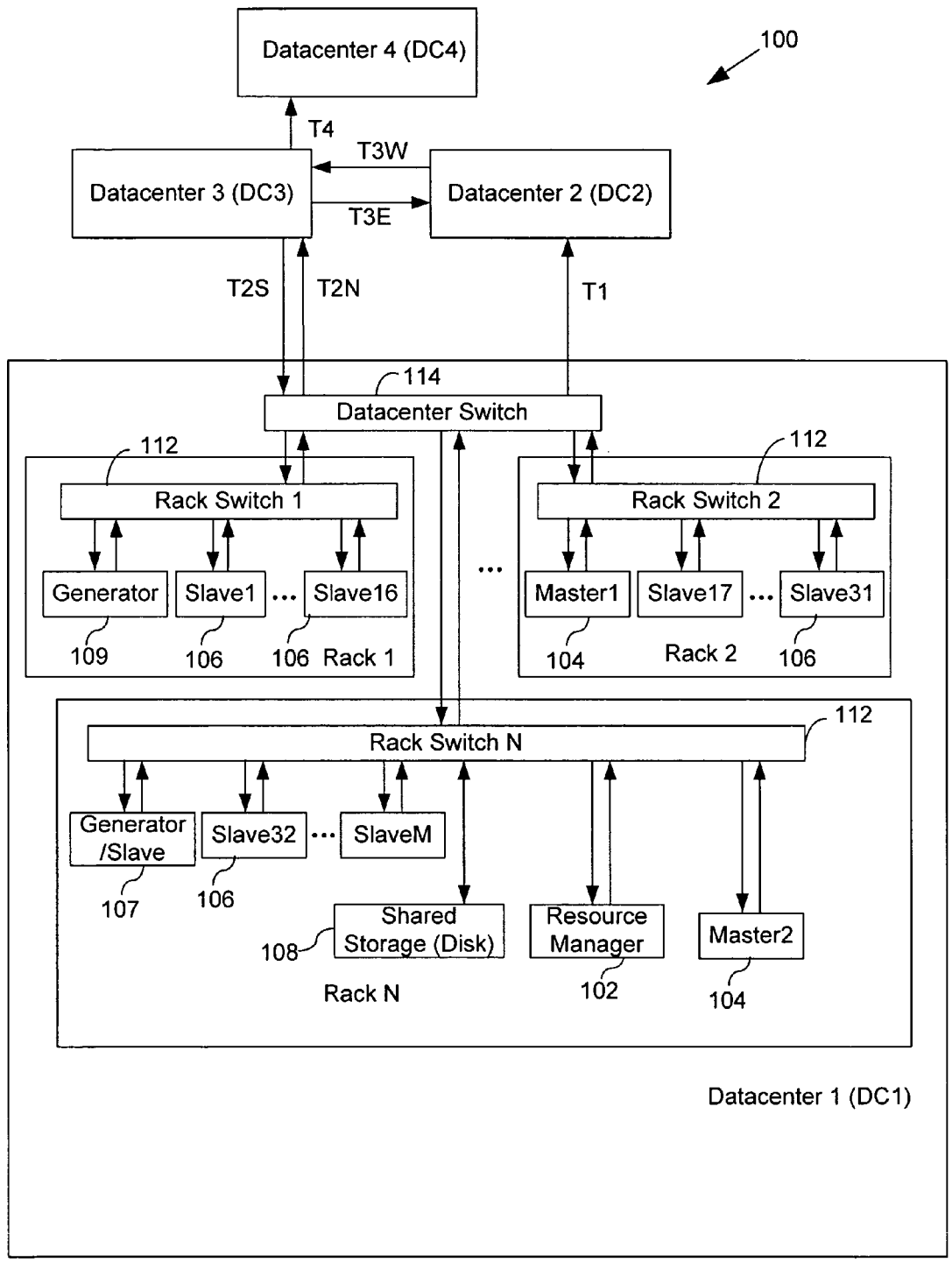
FIG. 1 is a block diagram of a data distribution network, according to an embodiment of the invention.

FIG. 1 is a block diagram of a data distribution network 100. It should be appreciated that the layout of this network 100 is merely exemplary and the network 100 may take on any other suitable layout or configuration. The network 100 is any suitable system for transmitting data, and may include dedicated optical links or other dedicated communication channels, as well as supporting hardware such as modems, bridges, routers, switches, wireless antennas and towers, and the like. The network 100 may include one or more wide area networks (WANs) as well as multiple local area networks (LANs). Furthermore, the network 100 may be a private network, i.e., a network operated exclusively for a particular company or entity, in which the company or entity leases circuits and sometimes switching capacity for the customer's exclusive use. Alternately, a public network with a fixed, known physical topology may be used.

The network 100 may include multiple dispersed datacenters (DC1-DC4). Some of the datacenters may be located, geographically, close to each other, and others may be located far from the other datacenters. Furthermore, one of the datacenters may be the primary source of new files to be distributed to the other datacenters, or alternately, the generation of new files may be shared by two or more of the datacenters. Each datacenter (DC1-DC4) may include multiple racks. For example, datacenter one (DC1) includes multiple racks (Rack 1-N). Physically, the racks may include frames or cabinets into which the slaves and other components, such as switches, are mounted. Each rack may include multiple slaves. For example, the first rack (Rack 1) includes multiple slaves (Slave1-Slave16), the second rack (Rack 2) includes multiple slaves (Slave17-Slave31), and the third rack (Rack 3) includes multiple slaves (Slave32-SlaveM). The slaves can include any electronic, electromechanical, or optoelectronic unit of equipment. In some embodiments, many or most of the slaves are computers. In other embodiments the slaves may include computer controlled devices, such as network attached storage devices.

Network 100 also includes a resource manager 102. The resource manager receives resource reservation requests from all of the masters 104, tracks the availability of resources for the entire network 100, and reserves resources for copy operations.

Network 100 also includes masters 104 and at least one or more generators 109. Masters 104 and generator(s) 109 may be distributed throughout the network 100 in any suitable manner. The generators 109 generate the data that will ultimately be distributed throughout the network 100, while the masters 104 schedule and control the data distribution throughout the network 100. In some embodiments, some of the slaves 106 may take on multiple roles. For example, in some embodiments, a slave and a generator are combined in a single device 107. In fact, many of the generators in a system may also function as slaves for purposes of the data distribution system. This dual functionality can be used to simplify the configuration and management of the system. Alternatively, or in addition, one or more separate generator(s) 109 may be provided. Also, a rack may include a shared storage device (e.g., magnetic disk) 108 that is shared by the one or more slaves and/or generators. In particular, in some embodiments, a generator stores the files it generates in a storage device 108 that is shared with a slave. The slave has full access to the files written to the shared storage device by the generator, and thus acts as a source of those files to the system.

In some embodiments, the generators 107/109 produce new files and new versions of files in a way that enables distribution of portions of the files before the entire file has been generated. This is important when the generation of a file takes many hours, because the process of distributing copies of the file can be largely overlapped with the generation of the file. In these embodiments, when a generator is producing a file whose length is greater than a predefined block size (e.g., 64 MBytes), the generator produces a checksum associated with each successive block of the file, where each block (except possibly the last block) of the file has the predefined block size. Periodically, the slave associated with the generator 107/109 publishes to the master 104 status information indicating the new size of the file being generated. The master uses that size information to identify other slaves which need copies of the newly generated blocks of the file. As a result, in many instances copy operations for copying the blocks of the file are scheduled and executed before the generator generates the last block of the file.

In another aspect of the embodiments in which files are generated as blocks, the generator also produces a final flag or other indicator value when the last block of a file has been generated. In some embodiments, the final flag (or equivalent indicator value) is stored in combination with the checksum for the last block of the file. When that checksum value and final flag are conveyed to a requesting slave, and the block is successfully received, the requesting slave knows that the file is complete and, therefore, knows that the file may be used in the operations of the requesting slave.

In some embodiment, the resource manager, all masters, generators, and slaves within each rack are interconnected to one another through a rack switch 112. For example, Slave1 through Slave16 in Rack 1 are interconnected through the Rack Switch 1, while the Master1 and Slave17 through Slave31 are interconnected through the Rack Switch 2. In one embodiment, each slave is coupled to its respective rack switch 112 through separate and distinct uplinks and downlinks, depicted in FIG. 1 by the up and down arrows coupling each slave to its respective rack switch. These uplinks and downlinks communicate unidirectionally. Furthermore, in some embodiments, all racks within each datacenter are also interconnected via a datacenter switch 114. For example, Racks 1, 2, and N are interconnected through the Datacenter Switch 1. In some embodiments, each rack is coupled to its respective datacenter switch through separate and distinct uplinks and downlinks, depicted in FIG. 1 by the up and down arrows coupling each rack to its respective datacenter switch. Again, these uplinks and downlinks communicate unidirectionally. In some embodiments, the rack switches 112 and datacenter switches 114 are crosspoint switches, also known as a crossbar or N×N switches, which are switching devices that provide for a fixed number of inputs and outputs, where the inputs and outputs communicate at full speed with one another. In use, the bandwidth of each of the connections provided by the rack and datacenter switches is significantly higher than that along the trunks, as described below. Furthermore, in some embodiments, the bandwidth of each connection provided by the rack switches 112 and datacenter switches 114 is greater than the input and output bandwidth of the slave devices. Accordingly, in these embodiments the rack and datacenter switches 112, 114 are treated as allowing infinite bandwidth connections between slaves directly connected to them, because these switches are never the locus of a bandwidth limitation when scheduling data transfers between slave devices.

In some embodiments, each datacenter (DC1-DC4) is coupled to another datacenter along dedicated trunks (T2S, T2N, T1, T3W, T3E, and T4). In some embodiments, these trunks communicate substantially unidirectionally. In particular, each trunk line may be asymmetric, providing a much larger bandwidth in one direction (the primary direction) than the other (the reverse direction). The reverse direction of each trunk is used primarily for TCP/IP control messages and the like, and can also be used for sending short messages such as slave status messages from slaves to the master. Some datacenters are coupled to one another through trunks in both directions, such as T2S and T2N, or T3W and T3E, while other datacenters are coupled to one another through a single unidirectional trunk, such as T1 or T4. The uplinks, downlinks, and trunks may include any suitable links, such as copper twisted pairs, coaxial cables, optical fibers, wireless connections, and the like.

Figure 3A:
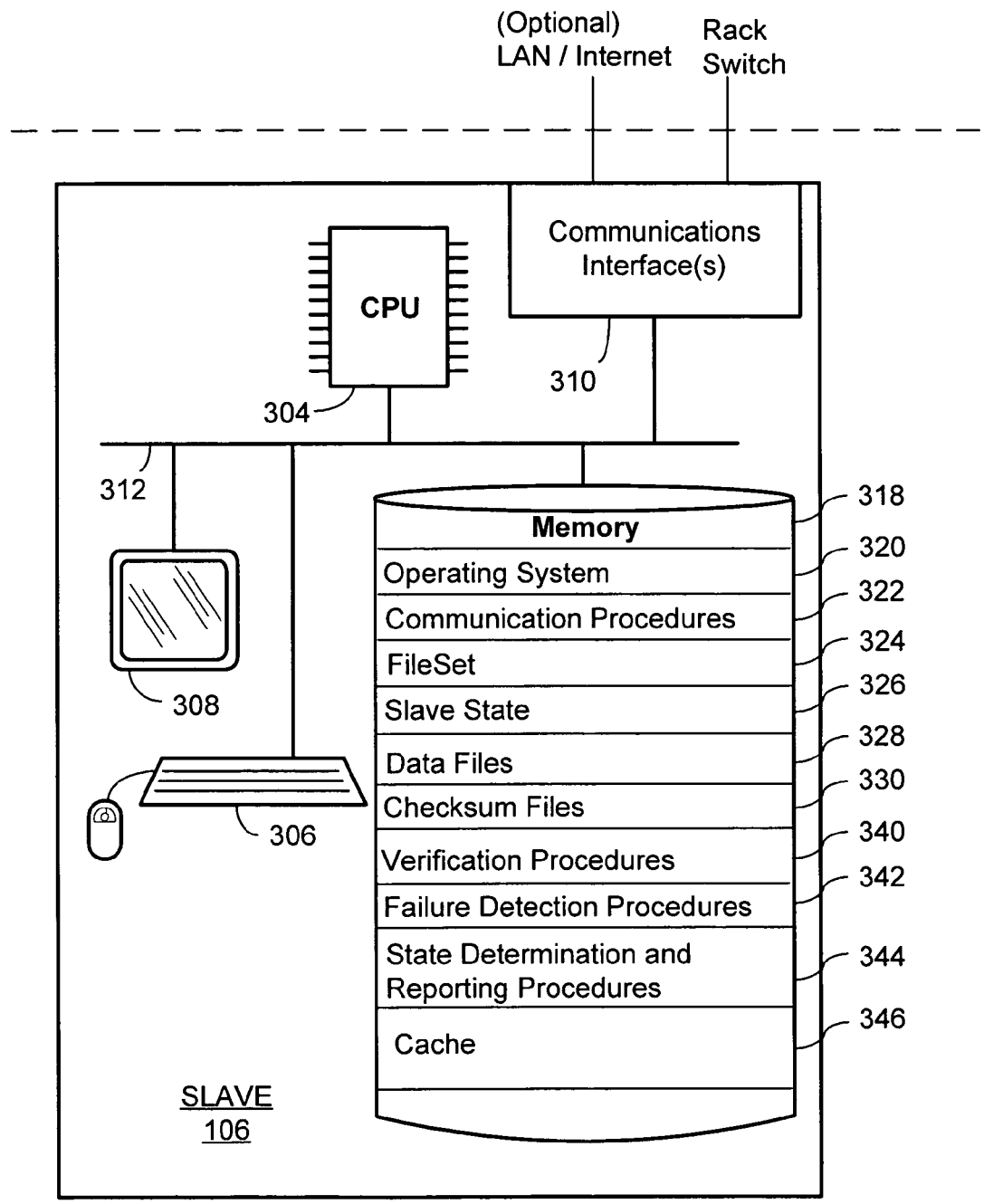
FIG. 3A is a block diagram of a slave shown in FIG. 1.

In some embodiments, each of the slave, master and generator devices is also connected (e.g., via communication interface(s) 310, FIG. 3A) to at least one additional communication network, not shown in FIG. 1. This network may be a local area network, wide area network or a combination thereof. The slave devices communicate status information to the master 104 through this additional network, while file transfers are conveyed through the switched network shown in FIG. 1. In other embodiments, the additional network is only for sending status information to the master 104 from slaves in data centers that do not have a trunk line connection back to the data center in which the master 104 resides.

Figure 2:
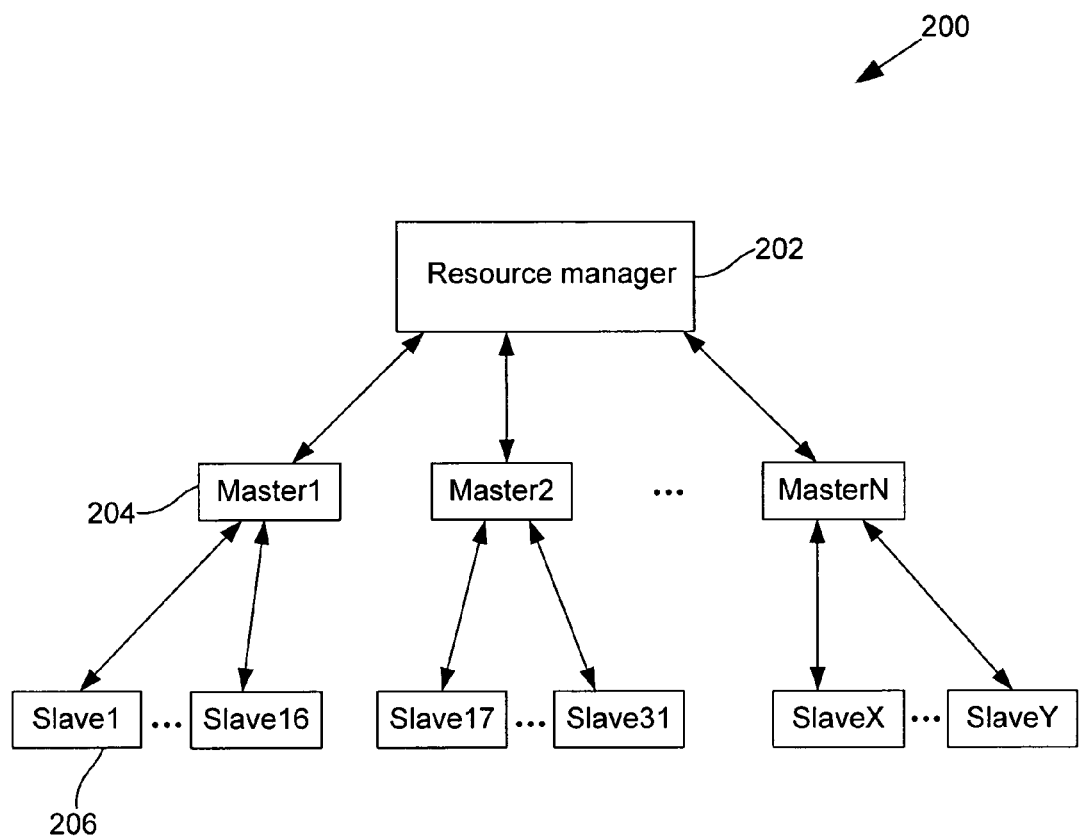
FIG. 2 is a block diagram of the logical topography of the data distribution network shown in FIG. 1, according to an embodiment of the invention.

FIG. 2 is a block diagram of the logical topology 200 of a data distribution network. It should be appreciated that the logical topology 200 of this network is merely exemplary and the topology 200 may take on any other suitable form. The topology 200 includes a resource manager 202, coupled to a plurality of masters 204, which are each coupled to one or more slaves 206. Each slave 206 generates, stores, and/or serves files belonging to one or more filesets. Filesets are groups of files. These groups of files may be grouped together based on what service a file is utilized for, or any other suitable predefined criteria. For example, a "News" fileset may include all files that index recent news presented on news websites.

Each master 204 is assigned responsibility for handling copy operations for one or more filesets. In other words, each master 204 is responsible for receiving requests for files in its fileset(s) from one or more slaves 206 and instructing slaves 206 to copy files in the fileset(s) to or from other slaves. In the topology 200, each master is shown to be logically grouped with a set of slaves, where each set of slaves requires a particular fileset. For example, in topology 200, Master1 is responsible for all copy operations for a particular fileset required by Slave1-Slave16. Similarly, Master2 is responsible for handling all copy operations for the fileset that Slave17-Slave31 requires, and so forth. However, it should be appreciated that although the topology 200 shows that each slave is assigned to only one master and communicates only with that master, in some embodiments a particular slave 206 may be assigned to more than one master, as that slave may require multiple filesets that are handled by different masters. For example, a SlaveQ (not shown) may require a fileset assigned to Master1 and a fileset assigned to Master2. In this case, SlaveQ will be assigned to both Master1 and Master2 and, accordingly, will communicate with both Master1 and Master2. However, it should be appreciated that each of the masters (Master1 and Master2) only handles copy operations for the filesets for which it is responsible. For example, if SlaveQ wants to copy a file from the fileset that was assigned to Master1, the scheduling for that operation must be handled by Master1 and SlaveQ must communicate with Master1 in regard to that operation, even though SlaveQ is also assigned to Master2 for a different fileset.

The resource manager 202 handles the resource reservation and allocation for the entire network. In other words, the resource manager 202 receives resource reservation requests from the masters 204; reserves resources for copy operations, if available; and sends commands to the masters 204 to initiate the copy operations. The resource manager also allocates resources on links between any slaves 206, racks, or datacenters based on the priorities of past copy operations on those links. This is explained in further detail below in relation to FIG. 9.

FIG. 3A is a block diagram of one of the slaves 106 shown in FIG. 1. Slave 106 includes: at least one data processor or central processing unit (CPU) 304; a memory 318; communications circuitry 310 for communicating with other slaves, masters, and/or generators in the network 100 (FIG. 1) via the rack and datacenter switches; at least one communication interface 310 for coupling the slave to a respective rack switch, and optionally to a local area network, the Internet or other communication network (not shown); and at least one bus 312 that interconnects these components. Each slave may optionally include one or more user interface devices, such as a monitor 308 and a keyboard/mouse 306. In some embodiments, one or more of the slaves in the system includes a subset and/or superset of the aforementioned components.

The memory 318 includes high-speed random access memory and may include non-volatile memory, such as one or more magnetic disk storage devices. In some embodiments, the memory 318 may include mass storage that is remotely located from the central processing unit(s) 304, such as the shared storage 108 shown in FIG. 1. The memory 318 stores an operating system 320, such as LINUX, UNIX or WINDOWS, that includes procedures for handling basic system services and for performing hardware dependent tasks. Memory 318 also stores communications procedures or instructions 322 used for communicating with other slaves, the masters, and/or the generator on the network 100 (FIG. 1). In particular, the communication procedures or instructions 322 are used for transmitting the slave state to the master, receiving instructions from the master, requesting and/or receiving data from other slaves or the generator, as described below in relation to FIG. 6.

The memory 318 also stores the following data structures, programs and instructions, or a subset or superset thereof:
at least one fileset file (FileSet) 324;
the slave state 326; data files 328;
checksum files 330;
verification procedures (or instructions) 340;
failure detection procedures (or instructions) 342;
state determination and reporting procedures (or instructions) 344; and
a cache 346 for temporarily storing data.

The FileSet 324 contains a list of files required by the particular slave, i.e. contains a list of files belonging to a particular fileset required by a slave. For example, the FileSet 324 shown in FIG. 3B lists File001, File002, and File002abc as forming part of FileSet 324. The FileSet that a slave requires is typically based on what service the slave is used for, or some other suitable predefined criteria. In some embodiments, a slave may also have multiple FileSets, as that slave may require multiple filesets for different services.

Each of the above identified modules or procedures corresponds to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 318 may store a subset of the modules and data structures identified above. Furthermore, memory 318 may store additional modules and data structures not described above.

FIG. 3B is a block diagram of an example of a fileset file (FileSet) 324. The required files are listed by file identifier (FileID) and file version number (Version). Thus, each entry in the FileSet 324 includes a file identifier and a file version number for one of the files that the slave needs in order to have a full and current set of files. In one embodiment, the FileSet 324 does not list itself as one of the required files, and the slave is originally deployed without a FileSet 324 stored in its memory. Instead, the Slave State of the slave is initialized to include an entry for the FileSet required by the slave, as will be explained in more detail below. In another embodiment the FileSet does list itself as one of the required files, and the slave may be deployed with a FileSet that lists itself. Once the master instructs the slave to copy the FileSet 324 required for that slave, and the slave obtains and stores the FileSet, the status information reported by the slave enables the master to determine whether that slave has the latest version of that FileSet and to schedule the FileSet to be updated if necessary, as explained below in relation to FIG. 6.

FIG. 3C is a block diagram of the slave state 326, as stored in the memory 318 (FIG. 3A) of a slave 106. The slave state 326 contains a list of all the files or portions of the files that have already been distributed to and stored by the slave as data files 328. The slave state 326 lists: all the files required by the slave, the version of each such file currently stored by the slave, and the current size of each such file. Each file may be listed by file identifier (FileID), version number (Version), and file size (File Size). Except for the FileSet file, the file identifier and version number are copied from the FileSet.

Generally, the data files distributed include very large files. To make the transfer of the large files more manageable, and to avoid having to retransmit an entire file when a failure occurs midway through a file transfer, the data files may be segmented into blocks, as shown in FIG. 3D. In one embodiment each block has a size of 64 MB (Megabytes) or less. More specifically, large files are both generated and copied in blocks of 64 MB, until the last block of the file has been received, which has whatever size (e.g., 64 MB or less) required to complete the file copy process. It should, however, be appreciated that the block sizes may be any suitable size and/or of different sizes, as determined in accordance with predefined criteria.

Accordingly, each slave receives the data files it requires as a sequence of blocks, until such time that each data file has been completely received. As noted above, the slave may receive one or more blocks of a data file before the generator of the file has generated the last block of the data file. The slave state of the slave indicates the amount of data for each data file that has been successfully received and stored by the slave. As will be explained in more detail below, each block of the data file may be received from a different source (e.g., a different slave) than the other blocks of the data file. While in practice many blocks of a data file may be copied in sequence from one slave to another, as network loading conditions change, the source of the blocks being copied to a slave may be changed by the master and resource manager. In fact, the resource reservation procedures 595 (FIG. 5A) on the resource manager select the source of each block to be copied by a slave in accordance with a predefined system resource reservation method that makes efficient use of system resources, especially data transmission resources. This source selection is described in further detail below, in relation to FIG. 7B.

Returning to FIG. 3A, the verification procedures 340 are used to verify the integrity of the data received by, or stored on, the slaves. In one embodiment, the verification procedures 340 include a procedure or instructions for comparing each received block with a received checksum file 330. In some embodiments, each data file 328 has a corresponding checksum file 330, as shown in FIG. 3D. The checksum file 330 includes a checksum value for each block of the data file. In some embodiments, each checksum is a cumulative checksum that is a function of (1) the data in the data file block corresponding to the checksum, and (2) the cumulative checksum for all the previous blocks of the file, if any. The checksum value may be a cyclic redundancy check (CRC) checksum, generated using a predefined polynomial function (e.g., the well-known 32-bit Ethernet CRC polynomial) or any other suitable checksum function.

For instance, to verify the integrity of Block 2 of a file, the destination slave device computes a checksum for the received block, using a predefined checksum function that is initialized with the cumulative checksum for the prior blocks of the file (in this case Block 1). If the computed checksum matches the checksum in the checksum file 330 for Block 2, then the transmission of Block 2 was successful and the destination slave can rely upon that data. The slave reports the successful block transfer to the master. If the computed checksum does not match the checksum in the checksum file 330 for Block 2, then the transmission of Block 2 failed, and the destination slave will report the failure to the master.

As each block of a data file 328 is received by a slave, the corresponding checksum value must also be conveyed to the slave. In some embodiments, the checksum is conveyed in a header portion of the transmission of the data file block. The slave is configured to retrieve the checksum from the header, compare the received checksum value with the one computed for the received block, and if the comparison indicates a successful data transfer, store the checksum in the respective checksum file. In another embodiment, a new copy of the checksum file 330 is transmitted by the sending slave to the receiving slave each time a block is transmitted to the receiving slave. The new copy of the checksum file includes the checksum corresponding to the block being transmitted to the receiving slave. Since the checksum file is generally very small (e.g., less than 4 KB, and usually much smaller), even for very large data files, transmitting the checksum file does not significantly affect the performance of the system.

In this way, the verification procedures 340 (FIG. 3A), described below, only calculate the integrity of the block received with respect to the checksum of the previous block received, without having to recalculate the integrity of all the blocks received for a particular data file. It should, however, be appreciated that any suitable checksum(s) and/or verification procedures may be used to verify the integrity of the blocks received.

The verification procedures 340 may also be used to verify the integrity of a block when read from disk storage to ensure that the block has been successfully read. In one embodiment, blocks are verified both by the source slave when it reads the block from disk storage, or other memory device, and by the destination slave when receiving the block.

The failure detection procedures 342 are generally used to detect failure of a data transfer. In particular, these failure detection procedures 342 may include instructions to assess the cause and/or source of the failure. For example, where a data transfer between slaves fails, the failure detection procedures 342 attempt to identify the source of the failure, such as the slave, switch, or trunk responsible for the failure.

The state determination and reporting procedures or instructions 344 are used to determine the slave state 326, and to then report the slave state to the master. These procedures or instructions 344 may include one or more incremental state update procedures, for updating the slave state 326 as blocks are received, verified, and stored to disk. These procedures 344 may also include one or more procedures for comparing the data files 328 received and stored, with the data required, i.e., from the FileSet 324. For instance, when the FileSet 324 indicates a different file version than what is stored in a slave, the state determination procedures 344 update the slave state 326 to indicate the new file version and to indicate that zero bytes of that file are stored by the slave. When the slave state has been updated, it is sent by the state determination and reporting procedures 344 to the master. In some embodiments, the slave state is also sent to the master each time the slave reports to the master the completion of a file block transmission.

Figure 4A:
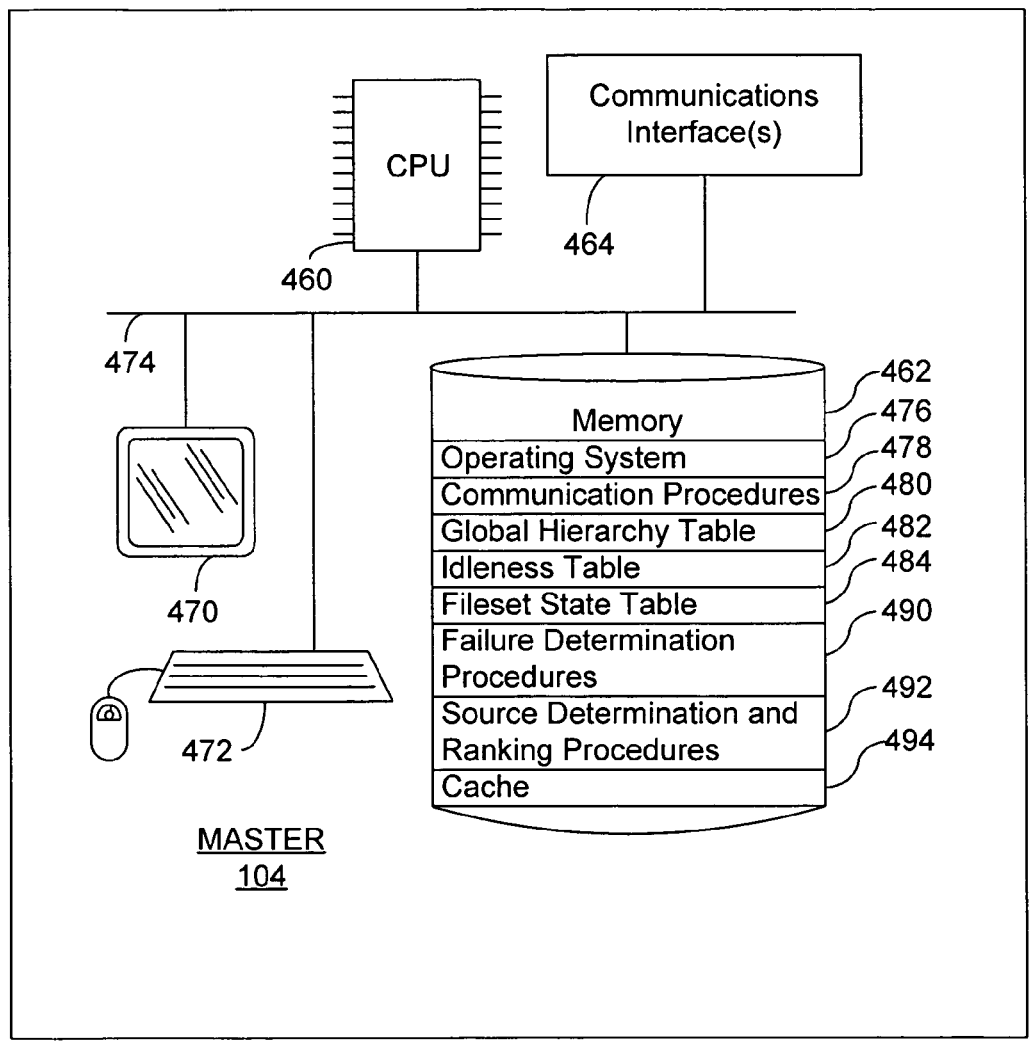
FIG. 4A is a block diagram of a master shown in FIG. 1.

FIG. 4A is a block diagram of a master 104 shown in FIG. 1. The master includes: at least one data processor or central processing unit (CPU) 460; a memory 462; at least one communications interface 464 for communicating with the slaves and the resource manager, and optionally with the generators, through one or more local area networks, a wide area network (e.g., the Internet), or a combination thereof; and at least one bus 474 that interconnects these components. In the embodiment shown, the master 104 communicates with the slaves, the resource manager, and optionally the generators through a rack switch (see FIG. 1). Each master may optionally include one or more user interface devices, such as a monitor 470 and keyboard/mouse 472. In some embodiments, one or more of the masters 104 includes a subset and/or superset of the aforementioned components.

The memory 462 stores the following programs, modules and data structures, or a subset thereof:

an operating system (OS) 476, such as LINUX, UNIX or WINDOWS that includes procedures for handling basic system services and for performing hardware dependent tasks;

communications procedures (or instructions) 478 that are generally used for communicating with the slaves, the resource manager, and optionally the generators in network 100 (FIG. 1); the communication procedures (or instructions) 478 are used for receiving a slave's state, requesting and obtaining system resources from the resource manager, and for transmitting instructions to slaves, as described in further detail below in relation to FIGS. 6 through 8;

a global hierarchy table 480;

an idleness table 482;

a fileset state table 484;

failure determination procedures (or instructions) 490;

source determination and ranking procedures (or instructions) 492; and a cache 494.

The global hierarchy table 480 is used by the master to determine the location of any slave and the proximity of slaves to one another. The idleness table 482 is used by the master to determine, for a potential source, the number of current copy operations that are outgoing from that potential source. The fileset state table 484 is used by the master to determine which files or blocks of files have been received by each slave requiring files in the fileset(s) for which the master is responsible. The fileset state stable 474 is used to determine what files or file blocks are still needed by each slave. The fileset state table 484 is also used by the master to determine which system resources have failed. The failure determination procedures or instructions 490 are used by the master for determining whether a resource has failed. The source determination and ranking procedures or instructions 492 are used to determine and rank the list of potential sources for a copy operation, as described in further detail below in relation to FIGS. 6, 7A, and 8. The cache 494 is used for temporarily storing data.

Each of the above identified modules or procedures corresponds to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 462 may store a subset of the modules and data structures identified above. Furthermore, memory 426 may store additional modules and data structures not described above.

A more detailed block diagram of the global hierarchy table 480 is shown in FIG. 4B. The global hierarchy table 480 contains a slave level graph 486 and a rack level graph 488. The slave level graph 486 lists all slaves in the network 100 (FIG. 1) by slave identifier (Slave ID). The slave level graph also lists a corresponding slave location (Slave Location) for each slave. For example, Slave134 is located in rack R35. From another viewpoint, the slave level graph identifies the parent of each slave in the system hierarchy, where each slave's parent is an identified rack.

Similarly, the rack level graph 488 lists all racks in the network 100 (FIG. 1) by rack identifier (Rack ID). The rack level graph also lists a corresponding rack location (Rack Location) for each rack. For example, rack R35 is located in datacenter 2 (DC2). This global hierarchy table 480 allows the master to determine the relative locations and/or distances between slaves and/or racks, and thereby increase distribution efficiency by transferring data between slaves that are physically close to one another.

In some embodiments, the global hierarchy table 480 may have an additional datacenter level graph (not shown) that provides the relative distances between datacenters. In alternative embodiments, the distance between two datacenters may be inferred from the naming convention used to name the datacenters.

FIG. 4C is a block diagram of the idleness table 482 shown in FIG. 4A. The idleness table 482 lists all slaves that store or require files for all the filesets for which the master is responsible. For each listed slave, the idleness table 482 maintains a count of current outbound transmissions, i.e. copy operations from that slave. For example, Slave1 has zero current outbound transmissions, and Slave2 has 3 current outbound transmissions. This idleness table 482 allows a master to quickly determine the current load on a particular slave. This load determination may be used when ranking sources for a potential copy operation.

In one embodiment, the master increments the count of current outbound transmissions for a slave when it sends the slave an instruction to commence a copy operation. Similarly, the master decrements the count when it receives a state update from the slave, indicating that an operation is complete. It should be appreciated that, in this embodiment, the master maintains, for a particular slave, the count of current outbound transmissions only for transmissions within the fileset(s) for which the master is responsible. This is because the master sends instructions and receives state updates only for the fileset(s) for which it is responsible.

In another embodiment, a slave itself maintains the count of total current outbound transmissions and includes the count in its state updates sent to the master. In this embodiment, the master is aware of all of its slaves' current outbound transmissions, regardless of fileset. Furthermore, in some embodiments the outgoing transmissions count may be kept as another field in the fileset state table 484 (FIG. 4D), rather than in a separate idleness table 482, as shown.

FIG. 4D is a block diagram of the fileset state table 484 shown in FIG. 4A. The fileset state table lists the states of those resources in the network 100 (FIG. 1) that are relevant to the fileset(s) for which the master is responsible, by resource identifier (Resource ID). Resources include slaves requiring the fileset(s) for which the master is responsible, denoted here as Slave 1 through Slave M, and all trunks (T1-TJ), datacenters (DC1-DCK), and racks (Rack 123-Rack N) those slaves utilize. Each resource has an associated state (State) that indicates whether that resource is functioning or not. For example, trunk 1 (T1) is functioning, while the second slave (Slave2) is not, where a one (1) indicates that the resource is functioning and a zero (0) indicates that the resource is not functioning.

In addition, each resource has an associated transmission attempts count (Attempts), as well as a failure count (Failure Count) that can be incremented or decremented by the failure determination procedures 490 (FIG. 4A). In use, the failure determination procedures 490 (FIG. 4A) are used to determine if a particular resource is likely to have failed. Each time a copy operation is attempted, the corresponding Attempts Count for each device or resource involved in the data transfer is incremented. Each time a copy operation fails, the Failure Count is incremented for each resource that is potentially responsible for the failure. In some embodiments, the master receives an indication from the receiving slave indicating which resource(s) are believed to be responsible for the failure. The failure determination procedures 490 (FIG. 4A) then increment the failure count (Failure Count) for those resources. For instance, the slave requesting a copy of a file block may determine that the failure was due to insufficient disk space in the requesting slave, or that it was unable to read the received file block from its own storage, in which case the slave's message will indicate that the failure occurred in the requesting slave. In one embodiment, if the requesting slave is unable to determine that a failure occurred in the requesting slave, then the presumption will be that the failure occurred elsewhere, in which case the Failure Count for all other resources involved in the copy operation will be incremented.

When the count reaches a predetermined upper threshold or limit, that resource is identified as a failed or bad device. For example, when the failure count of the second slave (Slave2) reached a predefined failure threshold (e.g., 50), the state (State) of the second slave was changed from a one (1) to a zero (0), thereby indicating that the second slave (Slave2) has failed. In addition, in some embodiments, the failure count (Failure Count) and the Attempts count (Attempts) have a half-life, such that the failure count and attempts count degrade over time. In some embodiments, every attempts count and every failure count value in the state table is decreased by a predefined amount at scheduled times. For instance, at the end of each time unit (e.g., 1 minute or 2 minutes), each non-zero Attempts Count and each non-zero Failure Count is decreased by 10 percent, rounded down to the next closest integer. In another example, at the end of each time unit, each non-zero Failure Count is decreased by a fixed amount (e.g., 1), and each non-zero Attempts Count is decreased by another fixed amount (e.g., 5). If a device is reported to have suffered several failures, its Failure Count is increased with each report. If the device then recovers or is repaired, and no additional failures are reported for the device, the system will periodically decrease the Failure Count for the device. When the Failure Count falls below a predefined recovery threshold (e.g., 25), the state of the device is changed to "functioning" (denoted by a "1" in the exemplary table of FIG. 4D) and the master resumes scheduling file transfers in which the device is a participant. The predefined failure and recovery thresholds may be defined so as to provide a period of time for failed devices to perform a reset or recovery operation, or for the device to be serviced or replaced by a technician.

In some embodiments, the predefined failure and recovery thresholds are a function of both the Failure Count and the Attempts Count for each resource. By factoring in the Attempts Count as well as the Failure Count, resources with much larger numbers of successful copy operations than failed operations are kept in service. As shown in FIG. 4D, for each slave the state table also records the last time the master received a communication from the slave (Last Contact). In some embodiments, the determination of whether the state of a slave device is alive ("functioning") or dead ("not functioning") takes into account the difference between the current system time and the Last Contact time denoted for the slave. In particular, in these embodiments the slaves are configured to periodically send a status message to the master (e.g., twice per minute), in addition to sending a message each time a copy operation completes or fails. If the difference between the current system time and the Last Contact time is substantially longer than the amount of time between periodic slave status reports, then this is further evidence that a slave device's state should be denoted as "not functioning". In some embodiments, the state table also keeps track, for each slave, the source that a slave last copied from in the Last Copied From field. This field is updated as a master sends instructions to slaves to commence copy operations. The information in this field may be used by a master to rank potential sources for a copy operation, as described in further detail below in relation to FIG. 8.

Furthermore, each entry for a slave listed in the state table 484 also includes state pointers (State Pointers). Each state pointer points to a copy of the slave state sent by the respective slave. The copy of the slave state includes a list of all the files required by the respective slave, the version of each such required file, and the current size of that file in the slave device. Each slave reports its slave state to the master both periodically and whenever a transmission to the slave is completed. The reported slave state is stored in the master's main memory at a location denoted by the corresponding State Pointer in the state table 484. For example, the state pointer for slave 3 (Slave3) points to the master's copy of the slave state for Slave3-R2-DC1. Accordingly, the state table 484 in the master provides the master with a record of all file blocks that have already been received by each slave.

In some embodiments, the state table includes a pointer 431 for each slave that points to a list 433 of slaves that store, or are configured to store, the same set of files. If there are N different types of slaves in the system, each configured to store a different set of files, then there will be N different lists 433 of slaves. In some embodiments, for each file listed in the slave state, the state information includes an Attempts count, a Failure Count and a State, each of which serves the same purpose as for other resources in the system. The meaning of these fields is described above. The state information for each listed file for a particular slave may optionally include a "Want Newest" flag, for indicating that the slave needs the latest version of the marked file, even if the slave's state did not indicate that it has requested that file. When the "Want Newest" flag is marked or set for a file, the master checks the list 433 of slaves configured to store the same files to determine if any of those slave store a newer version of the file than the version stored by the slave in question. When a newer version is found, the master attempts to schedule a copy operation for sending the slave the first block of the newer version of that file. For instance, in some embodiments the FileSet file is always marked with a "Want Newest" flag, thereby ensuring that each slave receives the current version of its FileSet file. The new version of the FileSet file may list new versions of other files that the slave needs to copy.

Figure 5A:
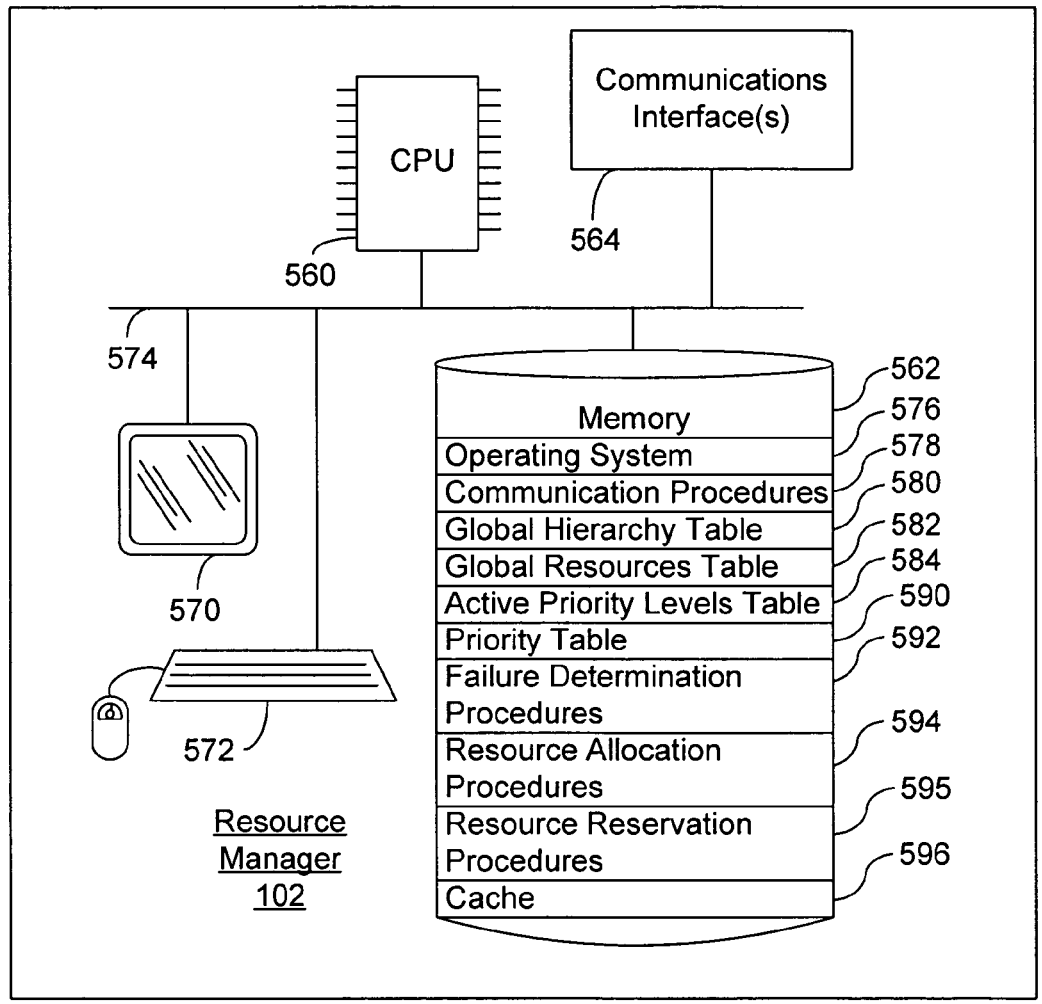
FIG. 5A is a block diagram of the resource manager shown in FIG. 1.

FIG. 5A is a block diagram of the resource manager 102 shown in FIG. 1. The resource manager may include the following programs, modules and data structures, or a subset thereof:
at least one data processor or central processing unit (CPU) 560;
a memory 562;
at least one communications interface 564 for communicating with the masters; and
at least one bus 574 that interconnects these components.

In the embodiment shown, the resource manager 102 communicates with the masters through a rack switch (see FIG. 1). In other embodiments, it could communicate with the masters through another network. The resource manager may optionally include one or more user interface devices, such as a monitor 570 and keyboard/mouse 572.

Memory 562 includes an operating system (OS) 576, such as LINUX, UNIX, or WINDOWS that includes procedures for handling basic system services and for performing hardware dependent tasks. Memory 562 also includes communications procedures or instructions 578 that are generally used for communicating with the network 100 (FIG. 1) and the masters. In particular, the communication procedures 578 are used for receiving a resource request from a master and transmitting instructions to a master to initiate a copy operation, as described below in relation to FIGS. 7A and 7B.

In some embodiments, the resource manager's memory 562 also stores the following programs, modules and data structures, or a subset thereof:
a global hierarchy table 580;
a global resources table 582;
an active priority levels table 584;
a priority table 590;
failure determination procedures (or instructions) 592;
resource allocation procedures (or instructions) 594;
resource reservation procedures (or instructions) 595; and
a cache 596.

The global hierarchy table 580 is used by the resource manager to determine the set of links required to perform a copy operation between any two slaves. The global resources table 582 is used by the resource manager to determine the available system resources for each link in the switched network. The active priority levels table 584 is used by the resource manager to track the priority levels of copy operations for each link, as described in further detail below in relation to FIGS. 7B and 9. The priority table 590 is used by the resource manager to determine the priority level of files in each fileset. The failure determination procedures or instructions 592 are used by the resource manager for determining whether a resource has failed. The resource allocation procedures or instructions 594 are used to allocate resources on each link, as described in further detail below in relation to FIGS. 7B and 9. The resource reservation procedures or instructions 595 are used to reserves resources on a link between a source slave and a destination slave. The cache 596 is used for temporarily storing data.

Each of the above identified modules or procedures corresponds to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 562 may store a subset of the modules and data structures identified above. Furthermore, memory 562 may store additional modules and data structures not described above.

The global hierarchy table 580 shown in FIG. 5B is the same as or similar to the global hierarchy table 480, as discussed above in relation to FIGS. 4A and 4B.

FIG. 5C is a block diagram of the global resources table 582 shown in FIG. 5A. The global resources table 582 includes multiple graphs, including a slave level resources graph 521, a rack level resources graph 525, a datacenter level resources graph 527, and a trunk level resources graph 528. These graphs list the maximum available resources and the resources currently being used, or reserved for use, for each slave, rack, datacenter, and trunk. Each graph tracks resources relevant to the data distribution network, such as bandwidth, or any other relevant system resource. For example, the exemplary slave level resources graph 521 lists Slave 1 as having a total inbound bandwidth of 100 with 0 in use, and having a total outbound bandwidth of 100 with 20 in use.

In some embodiments, the resource manager is not configured to track resource usage from other applications unrelated to data distribution that use the communication paths in the network, and therefore the resources values stored in the global resources table 582 (as described below) are adjusted values less than the actual full resources of the various communication paths in the network so as to take into account the fact that other applications share the use of those communication paths. In other embodiments, the resource manager may track resource usage from other applications. In these embodiments, the global resources table 582 would show the full total resources and full resources in use, without any adjustments.

The slave level resources graph 521, lists the resources for each slave. The record for each slave, identified by its slave identifier (Slave ID), includes fields specifying the maximum available inbound bandwidth (Inbound BW) and maximum available outbound bandwidth (Outbound BW) for that slave. For example, Slave 160 has a maximum inbound bandwidth (Inbound BW) of 100 MB/sec and a maximum outbound bandwidth (Outbound BW) of 100 MB/sec. The record for each slave also includes fields specifying the inbound bandwidth currently being used or reserved for use (In BW in use), and the outbound bandwidth currently being used or reserved for use (Out BW in use), is also listed for each slave. For example, for Slave 160, 10 MB/sec of the available inbound 100 MB/sec bandwidth is being used, or reserved for use, and none of the available outbound 100 MB/sec bandwidth is being used, or reserved for future use. The maximum available inbound bandwidth (Inbound BW), maximum available outbound bandwidth (Outbound BW), inbound bandwidth currently being used or reserved for use (In BW in use), and the outbound bandwidth currently being used or reserved for use (Out BW in use), is also listed for each rack and datacenter in the rack and datacenter level bandwidth graphs 525 and 527, respectively. These values are listed by rack identifier (Rack ID) or datacenter identifier (Datacenter ID), respectively.

The trunk level resources graph 528 lists, for each respective trunk line, a trunk identifier (Trunk ID), the maximum available bandwidth (BW); the bandwidth currently in use or reserved for use (BW in use); the starting point of the trunk (Start); the end point of the trunk (End); and the latency along that trunk (Latency). The start and end points identify the direction of data travel over each respective trunk. The latency is the delay between the time that a packet is transmitted and the time that it is received. For example, for the trunk T4 between datacenters 2 (DC2) and 3 (DC3) the maximum available bandwidth is 30 MB/s, 20 MB/s are in use, or reserved for use, and the latency along the trunk is 35 ms. The latency is used to calculate the optimal or preferred window size, as described below.

FIG. 5D is a block diagram of the active priority levels table 584 stored in the resource manager 102 (FIG. 5A). The table 584 includes a list of links or communication paths in the system. For each link the table 584 has pointers, a current pointer and a past pointer, associated with that link. The past pointer points to a past priority table that tracks, for that link, the priorities of copy operations that were requested (whether succeeded or failed) in the immediately preceding epoch. An epoch is a time interval for which the resource manager has made an allocation of resources to copy operations, based on priorities of past copy operations. The length of the epoch may be any predetermined length. In some embodiments, the epoch length is two seconds. For each epoch, the resource manager allocates the resources on a link amongst the priorities of copy operations that were requested in the immediately preceding epoch, as described in further detail below in relation to FIG. 9.

For each link, the past priority table includes a flag indicating the priorities of those transmissions requested on that link during the prior epoch. A "1" indicates that a copy operation of that priority was requested and a "0" indicates that a copy operation of that priority was not requested. For example, FIG. 5D lists that for link L1, copy operations with priorities P2 and P3 (as indicated by both having a flag value of 1) were requested in the immediately preceding epoch, but no copy operations with priority P1 were requested (as indicated by a flag value of 0). Alternatively, the past priority table may merely list the priorities of operations that were requested in the immediately preceding epoch without any flag, rather than listing all priorities and a flag for each priority.

The current pointer points to a current priority table for the link. The current priority table lists: all available priorities for the link; the total resources on that link that are allocated for each priority; and the remaining resources for each priority on that link. For example, for the current epoch, on link L1, there were no resources allocated to P1, and therefore no resources remaining. On link L2, a total of 400 MB of bandwidth were allocated to priority P2 with 300 MB still remaining unused, and on link L3, 600 MB of bandwidth were allocated to priority P3 with all of the resources used. In some embodiments, the amount of total resources is calculated by multiplying the total bandwidth of a link (in MB/s), which is derived from the global resources table 582, with the length of the epoch, to get the total resources for that link. In alternative embodiments, the resources remaining field may be replaced by a "resources in use" field that tracks the amount of resources in use for that epoch.

FIG. 5E is a block diagram of the priority table 590 shown in FIG. 5A. The priority table 590 lists all possible filesets that may be transferred within the network and their respective priorities. This table allows the resource manager to determine the priority of a potential copy operation based on the fileset to which the file to be copied belongs. Each fileset is assigned a certain priority. That priority may be based on the service a fileset supports. For example, a fileset used for a news search service may get a higher priority than a fileset used for an image search service, because the news search requires more frequent updating. However, it should be appreciated that the priorities can be assigned based on any predefined criteria. If a fileset has a high priority, then copy operations for files in that fileset will be allocated more resources on a particular link, to be shared by all copy operations within that priority on a first-come first-serve basis, than copy operations for filesets of lower priority. Additionally, a special listing for FileSets (i.e., the FileSet files) may be included in the priority table and be assigned the highest priority to ensure that copy operations for FileSets are allocated the most resources possible.

Figure 6:
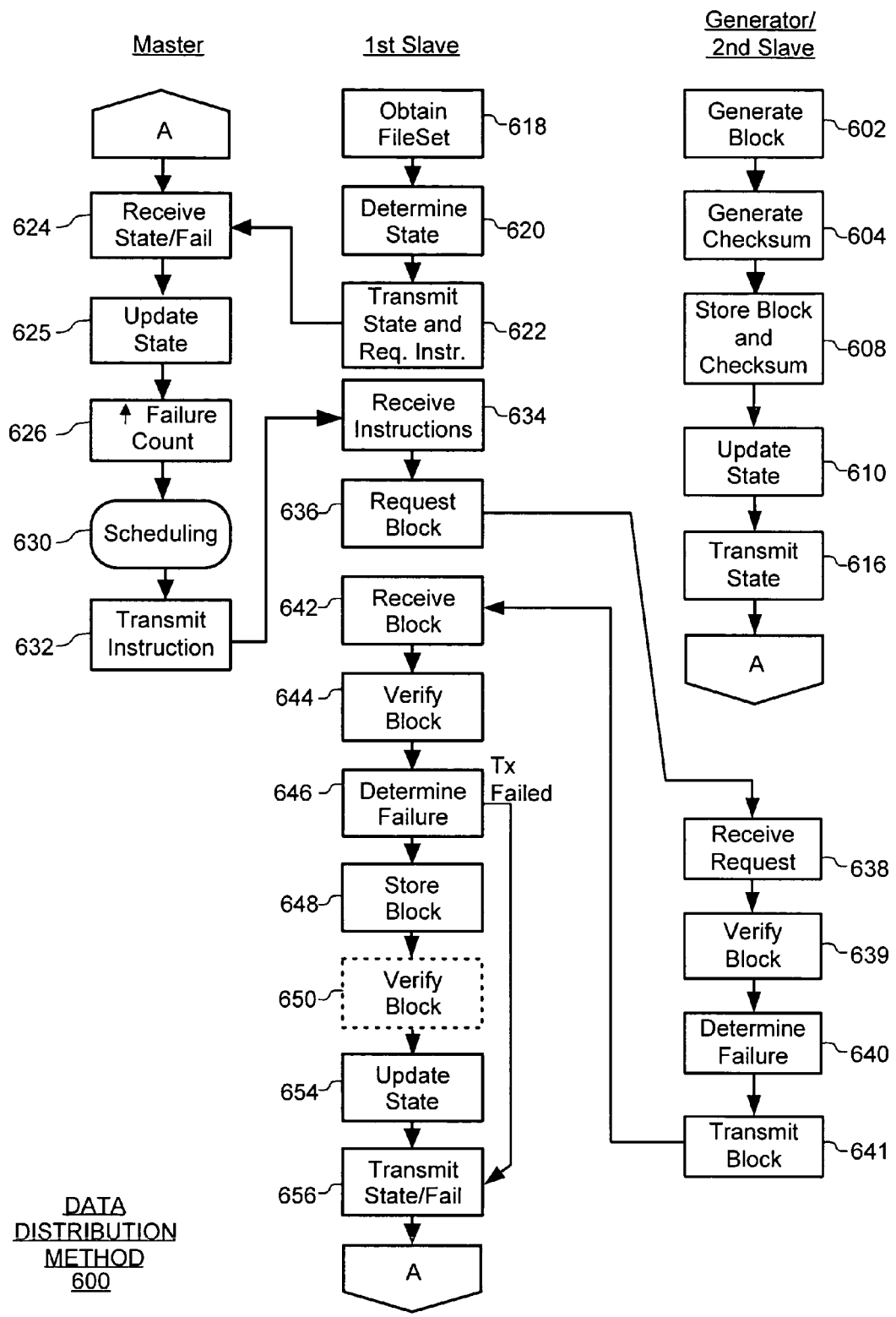
FIG. 6 is a flow chart of a method for distributing data, according to an embodiment of the invention.

FIG. 6 is a flow chart of a data distribution method 600, according to an embodiment of the invention. The method 600 describes a method whereby a single master 104 (Master) controls the distribution of files between a second slave (2nd Slave) or generator and a first slave (1st Slave). It should, however, be appreciated a master may control the distribution of any type of data between any number of slaves, as long as the data is within the fileset(s) for which the master is responsible. It should also be appreciated that the first slave and the second slave may be any of the slaves in the network 100 (FIG. 1) that require at least one fileset for which the master is responsible.

A generator 109 (FIG. 1) or a generator/slave 107 (FIG. 1) initially generates a block of a file (602). For example, the generator/slave generates the first 64 MB block of a file. The generator/slave also generates a checksum of the block (604). Although not shown, the generator/slave may also encrypt the block using digital signatures or the like. The block and checksum are then stored (608). In one embodiment, the block and checksum are stored by the generator 107 (FIG. 1) in the shared storage 108 (FIG. 1), which can be accessed by one or more of the slaves in the generator's rack (Rack N).

Alternatively, the generator/slave stores the block and checksum in internal memory. The block and checksum may be stored in a data file 328 and a checksum file 330 (FIGS. 3A and 3D) in the memory of a slave device (FIG. 3A), which, in FIG. 6, is also the generator/slave, herein identified as the second slave (2nd Slave). In other embodiments, the block and checksum may be stored in the memory of a slave that is not the generator and which has direct access to the memory in which the block is stored.

The state determination and reporting procedures 344 (FIG. 3A) on the 2nd Slave then updates the 2nd Slave's slave state (slave state 326) (FIG. 3A) at 610. The slave state is transmitted to the master either as soon as a new block is added, or periodically, or both (616).

Each slave stores one or more FileSets 324 (FIGS. 3A and 3B), containing a list of files that it must obtain and store. This file is periodically replaced with new versions as the versions of the files listed in the FileSet are updated. At 618, the 1st Slave receives either an initial FileSet or a replacement FileSet. The process for receiving the FileSet file is actually the same as for any other data file, and thus follows the methodology shown in FIG. 6. Thus, task 618 is a conceptual representation of the process by which the 1st Slave receives the current version of its FileSet. The state determination and reporting procedures 344 (FIG. 3A) on the 1st Slave determine the slave state 326 (FIGS. 3A and 3C) of the 1st Slave (620). To do this, the state determination and reporting procedures 344 (FIG. 3A) determine what blocks have already been received for each file listed in the FileSet. Further details regarding the content of the slave state are described above in relation to FIG. 3C.

The slave state of the first slave is transmitted to the master (622). In some embodiments, the slave transmits the slave state periodically, as well as each time a file block transfer completes, whether successfully or in failure. The slave state is received by the master (624), which then updates the fileset state table (625) (see 484, FIG. 4D).

The source determination and ranking procedures 492 (FIG. 4A) subsequently schedule one or more copy operations (630). This scheduling includes generating a ranked list of potential sources for providing a data block to a particular slave, sending the list to the resource manager, and receiving a response from the resource manager. This scheduling process is described in further detail below in relation to FIGS. 7A, 7B, and 8.

Based on the scheduling, the master transmits an instruction to the 1st slave (632), instructing the 1st Slave to obtain the block from the 2nd Slave. The instruction is received by the 1st Slave (634), which then requests the block from the 2nd Slave (636). The 2nd Slave receives the request for the block (638) and locates the block, and its associated checksum. Optionally, in some embodiments the 2nd Slave verifies the requested block (639) using its verification procedures 340 (FIG. 3A). The failure detection procedures or instructions 342 (FIG. 3A) on the 2nd Slave may determine whether the block has been successfully read from storage (640). If the requested block is verified, the 2nd Slave transmits the requested block and its associated checksum to the 1st Slave (641).

The block and its checksum are received by the 1st Slave (642). The verification procedures 340 (FIG. 3A) on the 1st Slave then verify the integrity of the received block using the received checksum (644). As described above, the verification procedures may use a cumulative checksum. The failure detection procedures 342 (FIG. 3A) then determine (646) whether the block was received and whether the block was verified. In some embodiments, if a failure occurred, the failure detection procedures 342 (FIG. 3A) determine which resource was most likely to be responsible for the failure. For instance, if the block was not received, the failure detection procedures may specify that an unknown resource other than the receiving slave is likely to be responsible for the failure.

If the block transfer and verification succeeded, the block is then stored in the 1st Slave's memory in the appropriate data file, and the checksum for the block is added to the corresponding checksum file (648). In some embodiments, the stored block may be verified at any time thereafter by the verification procedures (650) to ensure that the block was properly stored. The slave state of the 1st Slave is then updated (654) by the state determination and reporting procedures 344 (FIG. 3A). In particular, if the block transfer was successful, the size of the data file for which the block was received is updated. If the block transfer failed, the slave state will not be updated, because none of the files denoted in the slave state have increased in size. The slave state and any failure data is subsequently transmitted to the master (656).

The slave state and/or any failure data is received by the master (624). If a failure occurred, as evidenced from the failure data, the failure determination procedures 490 (FIG. 4A) on the master increment the failure count (Failure Count) (FIG. 4D) for the resource(s) to which the failure was attributed (626). Alternately, when a block transfer fails, the master increments the failure count of every resource involved in the block transfer, since the source of the failure is unknown. When the failure count for a resource reaches a predetermined limit, that resource is identified as failed or bad. As the failure count is automatically reduced at predefined intervals, the failure count decreases over time and the resource may again be determined to be good and allowed to re-enter service. Tasks 620-632 are repeated until all the required blocks have been received. However, the identity of the first and second slaves may differ with each repetition of this process.

Using the methodology of this data distribution method, many pairs of slaves will perform copying operations simultaneously. In particular, all the slaves in the system that require a particular fileset will send status information to the master assigned to that fileset. Slaves requiring a particular fileset that have less than a complete set of files will receive instructions from the master assigned to that fileset to commence copy operations. While some copy operations may be delayed by the resource manager due to system resource limitations, many simultaneous or overlapping copy operations will be executed in a typical implementation of the data distribution method. It should also be appreciated that the above described method may be used to distribute any type of file to the slaves, including sending new or updated FileSets to the slaves.

In an alternative embodiment, the master instructs slaves to send data (i.e., file blocks) to other slaves, instead of instructing slaves to copy file blocks from other slaves. In the context of the present invention, the use of a push methodology is substantially equivalent to the use of the pull methodology (for copying file blocks) described above. In this alternative embodiment, a source slave receives instructions from the master indicating a file block to transmit to a destination slave. The target slave, upon receiving the transmission, verifies the received file block, stores the file block if verified, and sends a confirmation or error message, depending on the outcome of the verification, to either the master, the source slave, or both.

Figure 7A:
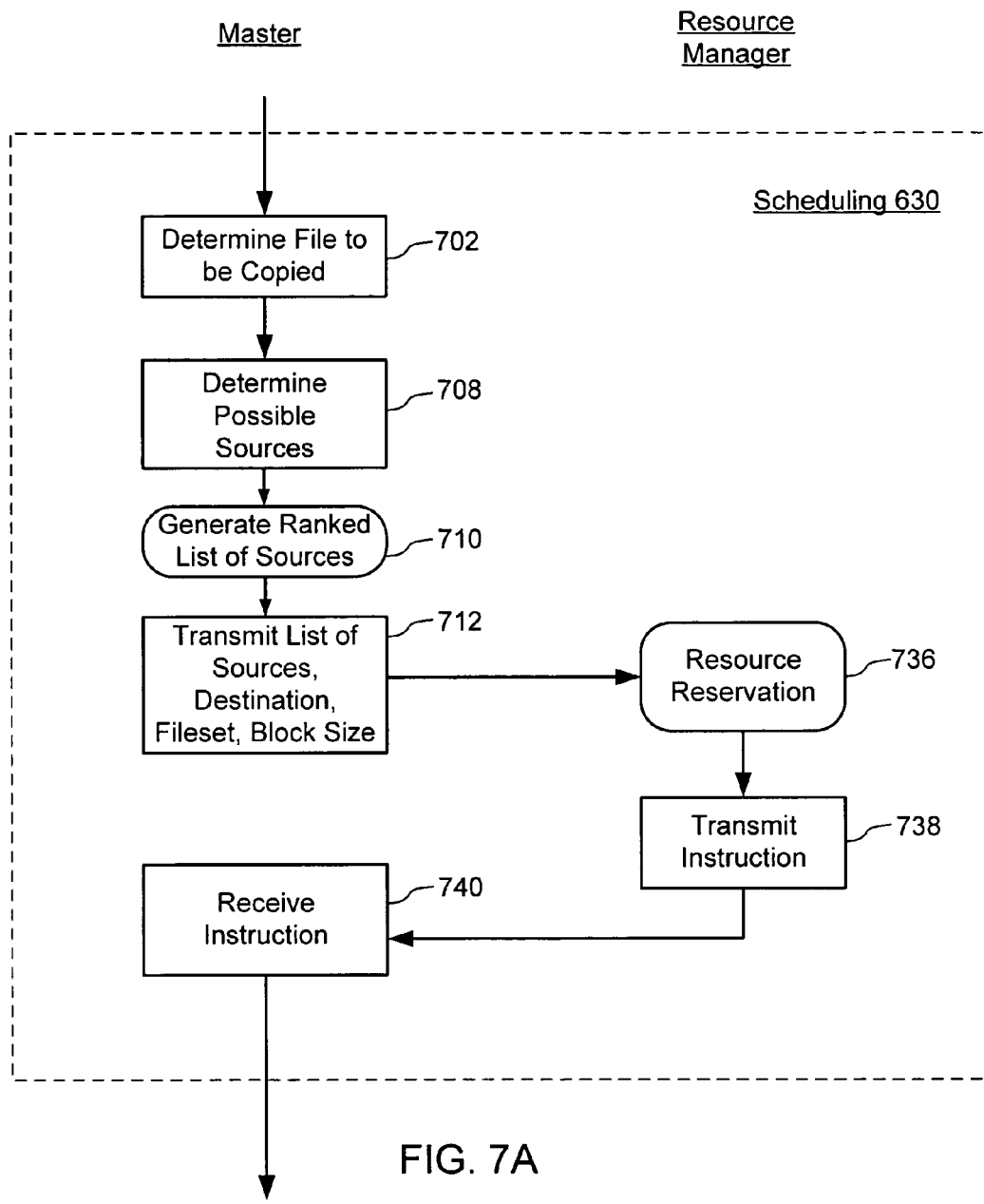
FIG. 7A is a flow chart of a scheduling task 630 in FIG. 6.

FIG. 7A is a flow chart of the scheduling task 630 of FIG. 6. Once a master has received the 1st Slave's state, at 624 (FIG. 6), and updated the fileset state table at 625 (as shown in FIG. 6), the master determines (702) what file the 1st Slave requires. For example, looking at the fileset state table shown in FIG. 4D, the master can determine that Slave3-R2-DC1 requires the file FileSet07, because the Want Newest flag for that file is set to 1. Generally, the master handles requests on a first-come, first serve basis. However, in some embodiments, if the file that the 1st Slave requires is a fileset file (FileSet), the master can process that request out of turn and ahead of other requests, using any suitable procedures. Alternatively, the need to obtain FileSet files first is addressed by assigning the highest priority to FileSet files.

At 708, the master determines the possible source slaves from which the 1st Slave (which can also be called the destination slave) can copy a block of the required file. The master determines the possible source slaves by referencing its fileset state table 484 (FIGS. 4A and 4D) and searching in the table for slaves that have the required file. Once the master has gathered the identities of potential source slaves, the master ranks the list of source slaves according to a predefined method and generates a ranked list of these sources (710). Further details of this ranking is described below in relation to FIG. 8.

At 712 the master sends the resource manager the ranked list, an identifier of the destination slave for the copy operation, and an identifier indicating what fileset the required file belongs to (or if the required file is itself a fileset file). In some embodiments, the master also sends a requested block size along with the list, which indicates the size of the file block to be copied. At 736, the resource manager, using its resource reservation procedures 595, reserves resources, if any, for the copy operation. Alternatively, the resource manager can fail the copy operation if there are no available resources. Further details of the resource reservation is described below in relation to FIG. 7B.

At 738, the resource manager transmits an instruction to the master. The instruction can be an instruction for the master to instruct the 1st Slave to request or "pull" the file block from the 2nd Slave. Alternatively, the instruction may be one to instruct the 2nd Slave to transmit or "push" the file block to the 1st Slave. The master receives the instruction (740), and continues to transmit an instruction to the first slave at 632 (FIG. 6). In an embodiment that uses the push methodology, the instruction would be sent to the 2nd Slave (source slave) instead of the 1st Slave (destination slave).

Figure 7B:
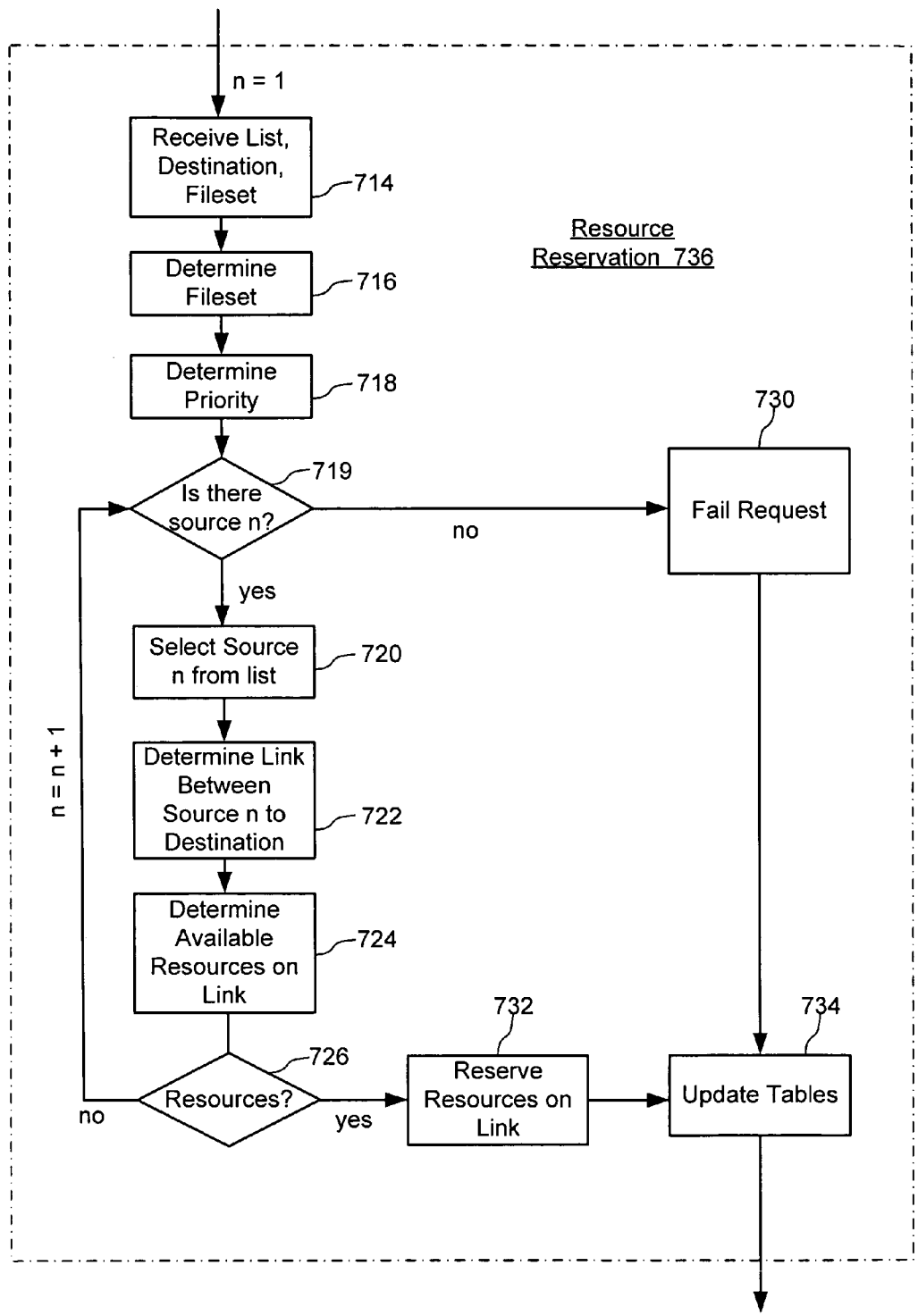
FIG. 7B is a flow chart of a resource reservation task 736 in FIG. 7A.

FIG. 7B is a flow chart of the resource reservation task 736 shown in FIG. 7A. Initially, a counter "n" is set to one. At 714, the resource manager receives from a master: a list of ranked potential sources for a copy operation; a destination slave identifier; and a fileset identifier. In some embodiments, the resource manager will also receive the block size of the file block to be copied. At 716, the resource manager determines what fileset the file to be copied belongs to (or if the file to be copied is a fileset file), by referring to the fileset identifier. At 718 the resource manager determines the priority of the copy operation based on the fileset identifier. This is performed by looking-up the fileset identifier in the priority table 590 (FIG. 5E). At 719, the resource manager determines if there is a source "n" in the list provided by the master. If there is a source n (719—yes) (which will be the case where n=1), the resource manager selects the n-th source from the list, which would initially be the first source in the list as n is set to one. In some embodiments, that first source will also be the highest ranked source, as the list would have been sorted (by the master sending the request) from highest ranked to lowest ranked.

If there is an n-th source in the list (719—yes), the resource manager selects that source (720). The resource manager then determines the link, or communications network path from the n-th source slave to the destination slave (722). Further, the resource manager determines if sufficient resources are available for the copy operation on the identified link (724). The resource manager does this by looking-up the resources remaining on that link for the priority of the file to be copied, in the current priority table in the active priority levels table 584 (FIG. 5D). For example, referring to FIG. 5D, if the priority of the potential operation is P2, as determined from the fileset identifier, then the resources remaining and available, in that epoch, for that copy operation is 300 MB. If the priority for the copy operation is P3, then there are no resources remaining on that link to accommodate that particular copy operation.

At 726, the resource reservation procedures at the resource manager determines if the resources remaining are sufficient to accommodate the potential copy operation. The resource manager does this by comparing the block size sent by the master at 712 (FIG. 7A) with the remaining resources on that link for the priority of the file to be copied. The remaining resources for the link are listed in the link's current priority table in the active priority levels table 584 (FIG. 5D). For example, if the block size for the copy operation is 54 MB and the resources remaining on the link is 300 MB, then there are sufficient resources on that link for the copy operation. If, however, the block size is 54 MB, but the remaining resources are 32 MB, then there are not sufficient resources on that link for the copy operation. If there are not sufficient resources (726—no), then the resource manager increments counter n, and goes back to 719 in an attempt to reserve resources on a different link to another source, and the process repeats itself. If, at 719, the resource manager finds that it has exhausted the source list, i.e., there is no source "n" in the list (719—no), then the resource manager will fail the requested operation at 730.

If there are sufficient resources (726—yes), then the resource manager reserves the resources for the operation at 732. For example, for a copy operation for a file block of 54 MB on a link with 300 MB of resources remaining on that link for the priority of the file to be copied, the resource manager would reserve 54 MB of resources by deducting that amount from 300 MB, leaving 246 MB remaining. Whether the resource manager reserved the resources for the copy operation or failed the copy operation, the resource manager updates the tables as needed at 734. For example, if a copy operation for a 54 MB file block, with a priority of P2 was requested, and there were 300 MB of available resources on the link, the resource manager would deduct 54 MB from 300 MB in the current priority table in the active priority levels table 584 (FIG. 5D) to reflect the new resource reservation. It may be noted that a copy operation may require the use of one or more than one link. When a copy operation requires the use of multiple links, the resources remaining for every link used by the copy operation are updated at 734. The resource manager would also set to 1 the flag for P2 in the past priority table of each link used by the copy operation, if the flag is not already 1. In other words, the resource manager updates the past priority table in the active priority levels table 584 (FIG. 5D) so that the resource manager keeps track of how to distribute resources amongst priorities on a link at the beginning of the next epoch. From there, the resource manager sends the instruction to the master to initiate or fail the copy operation at 738. Further details regarding the resource reservation 732 are described below in relation to FIG. 9.

During an epoch, received copy requests on a particular link may be of a higher or lower priority than any priority that has been allocated resources on that link. If the priority of the potential copy operation is higher than any priority that has been allocated resources on the particular link for the current epoch, the resource manager uses the remaining resources, if available, for the next highest priority that has been allocated resources. In other words, the resource manager "downgrades" the copy operation's priority to the next highest priority that has been allocated resources, in order to attempt to accommodate that copy operation on the particular link. For example, if the resource manager, for link A, has allocated resources to priorities P1, P2, and P3 for the current epoch, and receives a P4 copy request (where P4 is a higher priority than P3, P2 and P1), the resource manager would attempt to reserve resources from priority P3 for the P4 copy request, as P3 is the highest priority that has been allocated resources. If there are no resources on that link, the resource manager may choose another source, and thus another link, for the copy operation. In that case, because there might have been resources allocated for the original priority of the copy operation on the new link, resources for the copy operation may be reserved from the resource pool allocated to the original priority of the copy operation. For example, if the resources remaining on P3 were insufficient to accommodate the P4 copy operation, the resource manager will, instead of attempting to reserve resources from P2, choose the next source and a link B, which may have resources allocated for P4 copy operations. If P4 were allocated resources on link B, then the resource manager would attempt to reserve resources from the P4 resource allocation.

If the priority of the potential copy operation is lower than any priority that has been allocated resources on the particular link, the resource manager will choose another source for the operation, or if the source list has been exhausted, fail the operation. A lower priority operation will not be upgraded to the next lowest priority that has been allocated resources. For example, if a link has resources allocated for P2 and P3 and there is a request for a P1 copy operation, the resource manager would choose another source or fail the operation, and not attempt to reserve resources from P2 or P3.

Figure 8:
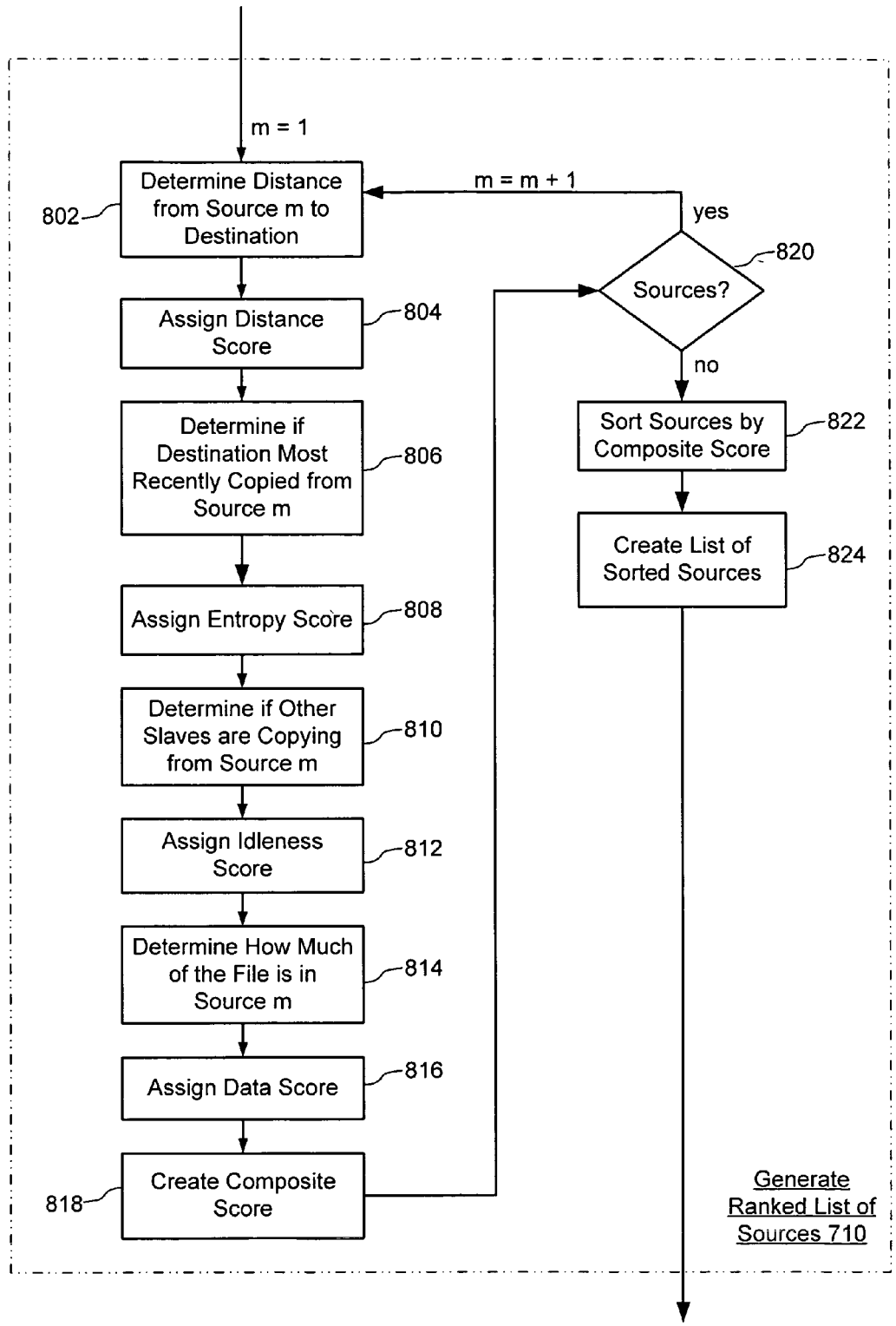
FIG. 8 is a flow chart of a task 710 (FIG. 7A) for generating a ranked list of sources.

FIG. 8 is a flow chart of a method for generating the ranked list of sources, corresponding to task 710 in FIG. 7A. Once a master has determined which slaves could be potential sources for the copy operation at 708, the master sets a counter "m" to 1. At 802, the source determination and ranking procedures 492 determines a distance on the network from source slave m to the destination slave. The global hierarchy table 480 (FIG. 4B) may be used to determine the network distance. The master then assigns a distance score to the source based on the determined distance (804). For example, if the distance between a destination slave A and a slave B is 5, then slave B should be assigned a better distance score than a slave C that is a distance 10 from slave A, because data transfers generally are faster when the distance between the source and destination is shorter.

The master subsequently determines if the last source that the destination slave copied from was source m. This is determined by looking up the Last Copied From field in the fileset state table 484 (FIG. 4D). At 808 the master assigns an "entropy" score to source m based on the determination performed at 806. For example, if a potential slave B was the last source slave that destination slave A copied from, then slave B would get a worse entropy score than a slave C that A did not last copy from. Slaves that the destination slave did not copy from are preferred because it is generally not desirable for one destination slave to copy from a single source slave all the time; spreading out the copy operations helps ensure fast delivery to all slaves requiring the same set of files.

At 810 the master determines if a source m is "idle," by looking up the current outbound transmissions count for source m in the idleness table 482 (FIG. 4C). At 812 the master assigns an idleness score to source m based on the outbound transmissions count. For example, a slave B with a current outbound transmissions count of 1 would get a better score than a slave C with a current outbound transmissions count of 3, because there is less current load on slave B.

In some embodiments, a potential source may be considered as a very undesirable source if the current outbound transmissions count is above a certain threshold, because that means that the potential source is overburdened with copy operations. In this case, the master may use any suitable procedures to "penalize" that potential source in the ranking such that it is not available as a source or that the resource manager will not likely select that source.

At 814, the master determines how much of the required file is stored at source m. At 816 the master assigns a data score based on the determination performed at 814. For example, a slave B that has 50 KB of the file would get a better data score than a slave C that has 100 KB. A source slave that has less of a file (but still has more of the file than the destination slave) than another source slave that has more of the file is preferred because the destination slave copies files in blocks and needs only the next block, which the slave with less of the file still has, and not a subsequent block. This ensures that resources on the source slave with more file blocks are available for other machines that need the later file blocks.

At 818 the master assigns a composite score to source m based on the individual scores previously assigned to the source (e.g., at 804, 808, 812, and 816). At 820 the master determines if there are any other potential sources to score. If there are (820—yes), then it increments counter m and returns to 802, to select the next source for scoring. If there are not (820—no), then the master sorts all the scored sources by their respective composite scores at 822. At 824 the master generates the sorted list of sources, which are sent to the resource manager at 712 (FIG. 7A).

The scoring flow chart of FIG. 8, described above, assumes that certain criteria, particularly distance, entropy, idleness, and how much of the file is in the source, are used. The flow chart of FIG. 8 also assumes that there is a predefined scoring and weighing scheme that assigns a score for each criterion and calculates a composite score based on a weighing of the individual scores. It should be appreciated, however, that any predefined criteria, scoring scheme, and weighing scheme may be used to order the potential sources of a particular file or file block.

Figure 9:
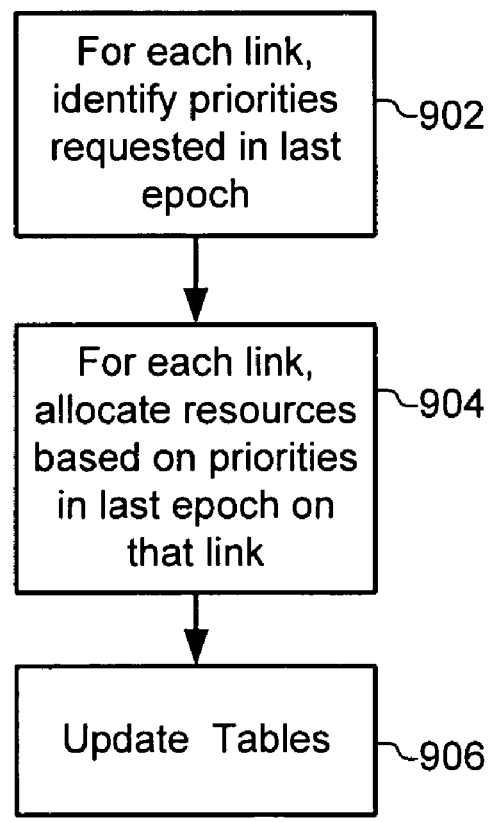
FIG. 9 is a flow chart of a method for allocating resources amongst priorities for a link in an epoch, according to an embodiment of the invention.

FIG. 9 is a flow chart of a resource allocation method 900. At the beginning of every epoch, the resource manager allocates resources on each link. This allocation ensures that high priority copy operations get a proportionally higher share of resources, without starving low priority copy operations of resources. When the current epoch starts, the resource allocation procedures 594 on the resource manager identifies (902), for a link, the priorities of copy operations requested for each link in the immediately preceding epoch. That identification is performed by checking the flags for each priority listed in the past priority table for each link in the active priority levels table 584 (FIG. 5D). At 904, the resource manager allocates the total resources available on each link, for the current epoch, based on the past priorities determined at 902. Each priority is assigned a predefined weight and the resources are allocated based on the weights, according to a predefined scheme. For example, at the beginning of the epoch, the resource manager determines that P2 (with, for example, weight 2) and P3 (with, for example, weight 3) copy operations were requested in the immediately preceding epoch. Then, the resource manager, in some embodiments, allocates 2/(2+3)=2/5 of the resources on that link, or 400 MB (assuming a 1000 MB total resources for that link), to P2 copy operations, and 3/(2+3)=3/5 of the resources, or 600 MB (also assuming 1000 MB total resources for that link), to P3 copy operations. It should be appreciated, however, that any suitable predefined weighing and allocation scheme may be used.

For any one priority that has been allocated resources on a link, all copy operations of that priority on that link share the allocated resources for that priority on a first-come first-serve basis. Each copy operation will either get resources sufficient to copy the needed file block, or the copy operation will have to be done with another source or failed. For example, if all copy operations of P2 are allocated 400 MB of resources in the current epoch, and there are five copy requests of priority P2 during that epoch, each requesting to copy a 90 MB file block, then the last of these requests to arrive at the resource manager will be denied because the first four would have been allocated a total of 360 MB in resources from the 400 MB, leaving only 40 MB, which is not sufficient to accommodate the fifth request, and thus that request is denied.

Sometimes, there will be copy requests received very late within an epoch, such that the copy operations resulting from them have to span two epochs. In some embodiments, the resource manager can account for these late copy requests by estimating how much of a file block, in a particular copy request, can be copied within the current epoch and reserving resources for copying the remainder of that block in the next epoch. For example, for a late copy request for a 64 MB block on a link, if the resource manager estimates that 20 MB of the block will be copied in the current epoch, then the resource manager will reserve 44 MB on that same link at the beginning of the next epoch, after resources have been allocated for that link. Thus, if the resources allocated on that link for the next epoch is 400 MB, then 44 MB will be subtracted from the 400 MB, leaving 356 MB for new copy operations. In some embodiments, additional fields may be added to the in the global resources table 582 (FIG. 5C) to track late copy operations.

At 906 the resource manager updates the current priority and past priority tables in active priority levels table 584 (FIG. 5D). The resource manager updates the current priority table with new total resource values. The resource manager also clears the flags for the past priority table so that the resource manager can track a new copy operation priorities in the current epoch, for use in allocating resources on a link for the next epoch.

A further feature of the above described system allows for a master to sort all slaves within the same datacenter and requiring the same fileset by the current size of the fileset residing on each slave and arrange the slaves in a tree data structure. In the tree, the slave(s) with the most data are at the root of the tree and the slaves with the least data are the leaves of the tree. A slave within the tree may be assigned as potential sources its parent slave in this tree structure and at least one other slave that is on the same level in the tree. The tree is refreshed periodically to reflect changes in fileset sizes within the slaves. When a master schedules a copy request, the master would use these potential sources instead of (or in addition to) determining the potential sources from the fileset state table, rank them, and send them to the resource manager. By arranging slaves in a fileset size order and having slaves copy from slave with a next bigger fileset size, files propagate in a tree-like fashion within the datacenter. This scheme distributes the data transmission load over many slaves and causes files to be distributed progressively.

Another further feature of the above described system allows for slaves and masters to fail, be removed from service, be replaced, etc. For example, if a slave fails or is removed from service, the failure count for that slave will rise until the slave is designated as bad. If the slave is replaced or comes back online, one of two things happen. First, the failure count for the slave will eventually drop below the predetermined failure threshold (or recovery threshold, if different) and the master again assumes that the slave is functioning. Second, if the slave sends its state to the master, the master then knows that the slave is operating. Similarly, if a master is replaced, the new master starts off without any slave states of any of the slaves in the system. However, over a short period of time all the slaves send their states to the master, which eventually assembles the states of all the slaves and begins scheduling data distribution.

The foregoing descriptions of specific embodiments of the present invention are presented for purposes of illustration and description. For example, any methods described herein are merely examples intended to illustrate one way of performing the invention. They are not intended to be exhaustive or to limit the invention to the precise forms disclosed. Obviously many modifications and variations are possible in view of the above teachings. Furthermore, if feasible, any single component described herein may be replaced with more than one of the same component, or multiple components may be incorporated into a single component. Also, any graphs described herein are not drawn to scale. The embodiments were chosen and described in order to best explain the principles of the invention and its practical applications, to thereby enable others skilled in the art to best utilize the invention and various embodiments with various modifications as are suited to the particular use contemplated. Furthermore, the order of steps, tasks or operations in the method are not necessarily intended to occur in the sequence laid out. It is intended that the scope of the invention be defined by the following claims and their equivalents.

I claim:

1. A method for distributing data over a network, the method performed by a master having one or more processors and memory storing one or more programs for execution by the one or more processors, the method comprising:

determining at said master that a destination slave requires data, wherein said destination slave is one of a plurality of slaves;

generating at said master a list of those slaves of said plurality of slaves that contain said data;

transmitting from said master to a resource manager said list, where said resource manager is configured to:

select a source slave from said list;

determine a link between the selected source slave and the destination slave;

determine whether sufficient resources are currently available on the link to transfer the data;

when sufficient resources are determined not to be currently available on the link, forgo reservation of resources on the link for transferring the data;

when sufficient resources are determined to be currently available on the link, reserve resources on the link for transferring the data, transmit an initiate instruction from said resource manager to said master to initiate a data transfer from said source slave to said destination slave;

if it is determined that there is no slave source on the list for which there are sufficient resources currently available on a respective link, terminate a corresponding operation; and update a priority table based on the determination of whether sufficient resources are currently available;

receiving at said master from said resource manager the initiate instruction to initiate a transfer of said data from said source slave to said destination slave; and transmitting from said master a commence instruction to commence said transfer, wherein the master, resource manager and slaves communicate with each other via the network.

2. The method of claim 1, wherein said transmitting comprises transmitting said commence instruction to said destination slave to copy said data from said source slave.

3. The method of claim 1, wherein said transmitting comprises transmitting said commence instruction to said source slave to copy said data to said destination slave.

4. The method of claim 1, further comprising after said generating, sorting said list of slaves based on predefined criteria.

5. The method of claim 4, wherein said sorting further comprises ranking each respective slave in said list based on a distance between said destination slave and said respective slave.

6. The method of claim 4, wherein said sorting further comprises ranking each respective slave in said list based on whether said destination slave recently copied data from said respective slave.

7. The method of claim 4, wherein said sorting further comprises ranking each respective slave in said list based on an activity level of said respective slave.

8. The method of claim 4, wherein said sorting said list further comprises ranking each respective slave in said list based on an amount of said data present in said respective slave.

9. A method for distributing data over a network, the method performed by a resource manager having one or more processors and memory storing one or more programs for execution by the one or more processors, the method comprising:

receiving at the resource manager, from a master, a list of slaves of a plurality of slaves that contain data to be copied to a destination slave;

selecting a source slave from said list as a source of data;

determining a link between the selected source slave and the destination slave;

determining whether sufficient resources are currently available on the link to transfer the data;

when sufficient resources are determined not to be currently available on the link, forgoing reservation of resources on the link for transferring the data;

when sufficient resources are determined to be currently available on the link, reserving resources on the link for transferring the data, transmitting an initiate instruction from said resource manager to said master to initiate a data transfer from said source slave to said destination slave, wherein the master, resource manager and slaves communicate with each other via the network;

if it is determined that there is no slave source on the list for which there are sufficient resources currently available on a respective link, terminating a corresponding operation; and updating a priority table based on the determining whether sufficient resources are currently available.

10. The method of claim 9, further comprising:

identifying priority levels associated with data transfers on a link between a slave from said list and said destination slave in a past time interval; and allocating resources for data transfers on said link in a current time interval based upon said priority levels in said past time interval.

11. The method of claim 10, further comprising:

updating an indication of priority levels associated with data transfers in said current time interval on said link between said source slave and said destination slave; and updating an indication of resources allocated to said priority levels associated with said data transfers in said current time interval on said link between said source slave and said destination slave.

12. The method of claim 10, further comprising selecting said source slave based on available system resources allocated to a priority level associated with said data.

13. The method of claim 12, further comprising selecting said source slave based on available system resources allocated to a lower priority level than said priority level associated with said data, if there are no resources allocated to said priority level associated with said data.

14. A method for distributing data over a network, performed on:

a master having one or more processors and memory storing one or more programs for execution by the one or more processors; and a resource manager having one or more processors and memory storing one or more programs for execution by the one or more processors;

said method comprising:

at the master, determining that a destination slave of a plurality of slaves requires data;

at the master, generating a list of slaves from said plurality of slaves that have said data;

at the master, transmitting said list to the resource manager;

at the resource manager, selecting a source slave from said list;

at the resource manager, determining a link between the selected source slave and the destination slave;

at the resource manager, determining whether sufficient resources are currently available on the link to transfer the data;

at the resource manager, when sufficient resources are determined not to be currently available on the link, forgoing reservation of resources on the link for transferring the data;

at the resource manager, when sufficient resources are determined to be currently available on the link, reserving resources on the link for transferring the data, transmitting an initiate instruction to the master to initiate a transfer of said data between said source slave to said destination slave;

at the resource manager, if it is determined that there is no slave source on the list for which there are sufficient resources currently available on a respective link, terminating a corresponding operation; and at the resource manager, updating a priority table based on the determining whether sufficient resources are currently available; and at the master, transmitting a commence instruction to said destination slave to commence said transfer, wherein the master, resource manager and slaves communicate with each other via the network.

15. The method of claim 14, further comprising:

at the resource manager, allocating system resources amongst copy operations on a link between said source slave and said destination slave based on priority levels for past copy operations on said link.

16. A non-transitory computer-readable medium carrying sequences of instructions which, when executed by one or more processors, cause the one or more processors to perform the steps of:
  determining at a master that a destination slave requires data, wherein said destination slave is one of a plurality slaves;
  generating at said master a list of those slaves of said plurality of slaves that contain said data;
  transmitting from said master to a resource manager said list, where said resource manager is configured to:
    select a source slave from said list;
    determine a link between the selected source slave and the destination slave;
    determine whether sufficient resources are currently available on the link to transfer the data;
    when sufficient resources are determined not to be currently available onthe link, forgo reservation of resources on the link for transferring the data;
    when sufficient resources are determined to be currently available on the link, reserve resources on the link for transferring the data, transmit an initiate instruction from said resource manager to said master to initiate a data transfer from said source slave to said destination slave;
    if it is determined that there is no slave source on the list for which there are sufficient resources currently available on a respective link, terminate a corresponding operation; and
    update a priority table based on the determination of whether sufficient resources are currently available;
  receiving at said master from said resource manager the initiate instruction to initiate a transfer of said data from said source slave to said destination slave; and
  transmitting from said master a commence to commence said transfer, wherein the master, resource manager and slaves communicate with each other via a network.

17. The non-transitory computer-readable medium of claim 16, wherein the instructions for transmitting said commence instruction comprises instructions for transmitting said commence instruction to said destination slave to copy said data from said source slave.

18. The non-transitory computer-readable medium of claim 16, wherein the instructions for transmitting said commence instruction comprises instructions for transmitting said commence instruction to said source slave to copy said data to said destination slave.

19. The non-transitory computer-readable medium of claim 16, wherein the instructions for generating said list further comprises instructions for, after said generating, sorting said list of slaves based on predefined criteria.

20. The non-transitory computer-readable medium of claim 19, wherein the instructions for sorting said list of slaves further comprises instructions for ranking each respective slave in said list based on a distance between said destination slave and said respective slave.

21. The non-transitory computer-readable medium of claim 19, wherein the instructions for sorting said list of slaves further comprises instructions for ranking each respective slave in said list based on whether said destination slave recently copied data from said respective slave.

22. The non-transitory computer-readable medium of claim 19, wherein the instructions for sorting said list of slaves further comprises instructions for ranking each respective slave in said list based on an activity level of said respective slave.

23. The non-transitory computer-readable medium of claim 19, wherein the instructions for sorting said list of slaves further comprises instructions for ranking each respective slave in said list based on an amount of said data present in said respective slave.

24. A non-transitory computer-readable medium carrying sequences of instructions which, when executed by one or more processors, cause the one or more processors to perform the steps of:
  receiving at a resource manager, from a master, a list of slaves of a plurality of slaves that contain data to be copied to a destination slave;
  selecting a source slave from said list as a source of data
  determining a link between the selected source slave and the destination slave;
  determining whether sufficient resources are currently available on the link to transfer the data;
  when sufficient resources are determined not to be currently available on the link, forgoing reservation of resources on the link for transferring the data;
  when sufficient resources are determined to be currently available on the link, reserving resources on the link for transferring the data, transmitting an initiate instruction from said resource manager to said master to initiate a data transfer from said source slave to said destination slave, wherein the master, resource manager and slaves communicate with each other via a network;
  if it is determined that there is no slave source on the list for which there are sufficient resources currently available on a respective link, terminating a corresponding operation; and
  updating a priority table based on the determining whether sufficient resources are currently available.

25. The non-transitory computer-readable medium of claim 24, wherein the instructions further comprises instructions for:
  identifying priority levels associated with data transfers on a link between a slave from said list and said destination slave in a past time interval; and
  allocating resources for data transfers on said link in a current time interval based upon said priority levels in said past time interval.

26. The non-transitory computer-readable medium of claim 25, further comprising instructions for:
  updating an indication of priority levels associated with data transfers in said current time interval on said link between said source slave and said destination slave; and
  updating an indication of resources allocated to said priority levels associated with said data transfers in said current time interval on said link between said source slave and said destination slave.

27. The non-transitory computer-readable medium of claim 25, wherein the instructions further comprises instructions for selecting said source slave based on available system resources allocated to a priority level associated with said data.

28. The non-transitory computer-readable medium of claim 27, wherein the instructions further comprises instructions for selecting said source slave based on available system resources allocated to a lower priority level than said priority level associated with said data, if there are no resources allocated to said priority level associated with said data.

29. A system for distributing data, comprising:
  a master having one or more processors and memory storing one or more programs for execution by the one or more processors of the master; and a resource manager having one or more processors and memory storing one or more programs for execution by the one or more processors of the resource manager;

said master being configured
- to determine that a destination slave requires data, wherein said destination slave is one of a plurality of slaves,
- to generate a list of those slaves of said plurality of slaves that contain said data,
- to transmit to said resource manager said list,
- to receive from said resource manager an initiate instruction to initiate a transfer of said data from a source slave to said destination slave, and
- to transmit a commence instruction to one of said source slave and said destination slave to commence said transfer; and said resource manager being configured
- to receive from said master said list of slaves,
- to select said source slave from said list based,
- to determine a link between the selected source slave and the destination slave; to determine whether sufficient resources are currently available on the link to transfer the data;
- when sufficient resources are determined not to be currently available on the link, to forgo reservation of resources on the link for transferring the data;
- when sufficient resources are determined to be currently available on the link, to reserve resources on the link for transferring the data, to transmit to said master said initiate instruction, wherein the master, resource manager and slaves communicate with each other via the network;
- if it is determined that there is no slave source on the list for which there are sufficient resources currently available on a respective link, to terminate a corresponding operation; and
- to update a priority table based on the determination of whether sufficient resources are currently available.

30. The system of claim 29, wherein said list is sorted based on predefined criteria.

31. The system of claim 29, wherein said resource manager is further configured to ascertain resources on a link between said source slave and said destination slave.

32. The system of claim 29, wherein said resource manager is further configured to allocate resources along a link between said source slave and said destination slave amongst priority levels of data transfers based on priority levels of past data transfers on said link.

33. The system of claim 29, wherein said master is further configured to determine:
- an indication of a state of each slave in at least a subset of said plurality of slaves; and
- an indication of activity level of said each slave.

34. The system of claim 29, wherein said resource manager is further configured to determine:
- an indication of maximum system resources on each link between said plurality of slaves; and
- an indication of system resources remaining on each said link.

35. A system for distributing data, comprising:
a resource manager having one or more processors and memory storing one or more programs for execution by the one or more processors of the resource manager, the one or more programs comprising instructions for:
- receiving at the resource manager, from a master, a list of slaves of a plurality of slaves that contain data to be copied to a destination slave;
- selecting a source slave from said list as a source of data;
- determining a link between the selected source slave and the destination slave;
- determining whether sufficient resources are currently available on the link to transfer the data;
- when sufficient resources are determined not to be currently available on the link, forgoing reservation of resources on the link for transferring the data;
- when sufficient resources are determined to be currently available on the link, reserving resources on the link for transferring the data, transmitting an initiate instruction from said resource manager to said master to initiate a data transfer from said source slave to said destination slave, wherein the master, resource manager and slaves communicate with each other via the network;
- if it is determined that there is no slave source on the list for which there are sufficient resources currently available on a respective link, terminating a corresponding operation; and
- updating a priority table based on the determining whether sufficient resources are currently available.

36. The system of claim 35, further comprising instructions for:
- identifying priority levels associated with data transfers on a link between a slave from said list and said destination slave in a past time interval; and
- allocating resources for data transfers on said link in a current time interval based upon said priority levels in said past time interval.

37. The system of claim 36, further comprising instructions for:
- updating an indication of priority levels associated with data transfers in said current time interval on said link between said source slave and said destination slave; and
- updating an indication of resources allocated to said priority levels associated with said data transfers in said current time interval on said link between said source slave and said destination slave.

38. The system of claim 36, further comprising instructions for selecting said source slave based on available system resources allocated to a priority level associated with said data.

39. The system of claim 38, further comprising instructions for selecting said source slave based on available system resources allocated to a lower priority level than said priority level associated with said data, if there are no resources allocated to said priority level associated with said data.

* * * * *

UNITED STATES PATENT AND TRADEMARK OFFICE
CERTIFICATE OF CORRECTION

| | |
|---|---|
| PATENT NO. | : 8,346,843 B2 |
| APPLICATION NO. | : 11/009569 |
| DATED | : January 1, 2013 |
| INVENTOR(S) | : Arvind Jain |

It is certified that error appears in the above-identified patent and that said Letters Patent is hereby corrected as shown below:

At column 27, line 18, please delete "onthe" and insert -- on the --.

Signed and Sealed this
Nineteenth Day of February, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,346,843 B2 | Page 1 of 1 |
| APPLICATION NO. | : 11/009569 | |
| DATED | : January 1, 2013 | |
| INVENTOR(S) | : Arvind Jain | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1988 days.

Signed and Sealed this
Eleventh Day of November, 2014

Michelle K. Lee
*Deputy Director of the United States Patent and Trademark Office*